United States Patent
Oh

(10) Patent No.: US 7,426,589 B2
(45) Date of Patent: Sep. 16, 2008

(54) NETWORK INTERFACE CARD FOR REDUCING THE NUMBER OF INTERRUPTS AND METHOD OF GENERATING INTERRUPTS

(75) Inventor: Hwa-seok Oh, Seoul (KR)

(73) Assignee: Samsung Electronics Co., Ltd., Suwon-Si (KR)

( * ) Notice: Subject to any disclaimer, the term of this patent is extended or adjusted under 35 U.S.C. 154(b) by 301 days.

(21) Appl. No.: 10/614,455

(22) Filed: Jul. 7, 2003

(65) Prior Publication Data

US 2004/0042505 A1 Mar. 4, 2004

(30) Foreign Application Priority Data

Sep. 4, 2002 (KR) ...................... 10-2002-0053326

(51) Int. Cl.
*G06F 3/00* (2006.01)
*G06F 13/00* (2006.01)
*G06F 5/00* (2006.01)

(52) U.S. Cl. .......................................... 710/47; 710/48

(58) Field of Classification Search ................... 710/47, 710/48
See application file for complete search history.

(56) References Cited

U.S. PATENT DOCUMENTS

| | | | |
|---|---|---|---|
| 5,717,932 A | 2/1998 | Szczepanek et al. | 395/733 |
| 5,983,275 A | 11/1999 | Ecclesine | |
| 6,115,776 A | 9/2000 | Reid et al. | 710/260 |
| 6,345,302 B1 * | 2/2002 | Bennett et al. | 709/236 |
| 6,397,282 B1 | 5/2002 | Hashimoto et al. | |
| 6,467,008 B1 * | 10/2002 | Gentry et al. | 710/261 |
| 2002/0029305 A1 * | 3/2002 | Satran et al. | 710/33 |
| 2003/0061426 A1 * | 3/2003 | Connor | 710/265 |
| 2003/0084214 A1 * | 5/2003 | Dunlap et al. | 710/52 |
| 2003/0200368 A1 * | 10/2003 | Musumeci | 710/260 |

FOREIGN PATENT DOCUMENTS

TW 338131 8/1998

* cited by examiner

*Primary Examiner*—Tariq R. Hafiz
*Assistant Examiner*—Scott Sun
(74) *Attorney, Agent, or Firm*—F. Chau & Associates, LLC

(57) ABSTRACT

A method of generating interrupts and a network interface card, which minimizes the number of times that interrupts are generated, are provided. The method includes receiving data frames; estimating a first and second time delay and counting a number of received data frames; determining whether the first time delay has passed and generating an interrupt if the time reaches the first delay time, counting the number of data frames if the first time delay has not passed and generating the interrupt if the number of data frames is equal to N; determining whether the second time delay has passed if the number of data frames is not equal to N and generating the interrupt if the second time delay has passed; stopping operations of estimating the first and second time delays and counting the number of data frames in response to the interrupt generated, and transmitting the received data frames.

27 Claims, 14 Drawing Sheets

NETWORK INTERFACE CARD FOR REDUCING THE NUMBER OF INTERRUPTS AND METHOD OF GENERATING INTERRUPTS

PRIORITY

This application claims priority to Korean Patent Application No. 2002-053326, filed on Sep. 4, 2002, in the Korean Intellectual Property Office.

BACKGROUND OF THE INVENTION

1. Field of the Invention

The present invention relates generally to a network interface card, and more particularly, to a network interface card for reducing the number of interrupts generated in an Ethernet network and a method of generating interrupts.

2. Description of the Related Art

To improve the performance of a controller used in a gigabit Ethernet network, which is up to 10 times faster than a general 100 Mbps Ethernet network, it is necessary to optimize the transmission of interrupts, which require a considerable amount of processing time in data transmission. By reducing the number of interrupts when data are processed, the number of overheads to be processed is reduced. Thus, the performance of the controller may be improved.

A network interface card (NIC) is installed in a personal computer of a user to establish an interface connection to an Ethernet LAN (Local Area Network). The NIC has a controller and a transceiver that enable the user to use the Ethernet LAN. It is the controller that has an influence upon the performance of the NIC. The controller includes a bus interface unit for interfacing with the personal computer, a direct memory access (DMA) unit for writing to or reading from a memory, and a media access control core for processing of a protocol of the Ethernet.

FIG. 1 shows the operation of a controller of a network interface card (NIC).

Referring to FIG. 1, a network interface card (NIC) 100 includes a controller 110 and a transceiver 120. The controller 110 includes a bus interface unit 111, a direct memory access (DMA) unit 113, and a media access control (MAC) core 115.

Hereinafter, the transceiving of data of the NIC 100 will be described with reference to FIG. 1.

A data frame DF to be transmitted is sent to a device driver 150 through an upper layer protocol (ULP) of an operating system (OS), e.g., a transmission control protocol/Internet protocol (TCP/IP) or a user datagram protocol (UDP). Here, the device driver 150 is software that drives the NIC 100 (step (1)).

The device driver 150 sends the data frame DF to a memory region which the DMA unit 113 of the controller 110 accesses, e.g., a first memory Tx Queue 130 (step (2)). Then, the device driver 150 sends a transmission command to the controller 110 (step (3)).

The controller 110, which receives the transmission command, tests the first memory Tx Queue 130 by using the DMA unit 113 and transfers the data frame DF into itself (step (4)), and transmits the data frame DF, which is processed in the controller 110, to an external network (not shown) (step (5)).

To transmit data to the external network, the MAC core 115 in the controller 110 forms Ethernet frames by using the data.

When the data frame DF is received, the data frame DF is processed inversely to the transmission process. To receive the data frame DF, the device driver 150 allocates a second memory Rx Queue 140 in which a received data frame DF will be stored and informs the controller 110 when data frame DF is stored in the second memory Rx Queue 140.

When the data frame DF is received by the transceiver 120 of the NIC 100, the MAC core 115 checks whether the data frame DF is effective (step (a)).

After the MAC core 115 determines whether the data frame DF is received, the data frame DF is sent to the DMA unit 113. The DMA unit 113 transmits a received data frame DF to the second memory Rx Queue 140 (step (b)). After transmission of the data frame DF is completed, the DMA unit 113 informs the device driver 150 that it is ready to transmit the received data frame DF by generating an interrupt (INTS) (step (c)).

The interrupt INTS generated in the NIC 100 is processed by the OS and sent to the device driver 150 (step (d)). After the device driver 150 receives the interrupt INTS, it tests the second memory Rx Queue 140, searches for the received data frame DF (step (e)), and transmits the received data frame DF to the upper layer protocol (step (f)).

In these steps, since the MAC core 115 or the transceiver 120 does not store the data frame DF to be transeived, the performance of transeceiving depends on an operation of the DMA unit 113 or the device driver 150.

That is, if delays occur when the DMA unit 113 writes to or reads from the first memory Tx Queue 130 or the second memory Rx Queue 140, the time taken for transmission of one data frame DF is delayed, thus the performance of the NIC 100 is degraded.

However, the most important factor to the performance of transceiving of the data frame DF is an operation time of the device driver 150. The operation of the DMA unit 113 is performed by hardware, and thus overheads occurring therein have little influence on the performance of the NIC 100 compared to the device driver 150 that operates by software. Therefore, it is necessary to optimize the operation of the DMA unit 113 to process the data frame DF with minimum operations of the device driver 150 so that the performance of the controller 110 of the NIC 100 can be improved.

The transmission of the interrupt INTS occupies most of the time necessary for the transmission of the data frame DF. After operation of the DMA unit 113 is completed, the interrupt INTS is generated and is firstly processed by the OS. After the OS senses the generated interrupt INTS, the OS stops its operation and starts performing a process routine of the interrupt INTS. The process routine of interrupt INTS searches for, a program that will process the generated interrupt INTS and is performed by the device driver 150. That is, the process routine of the interrupt INTS includes complicated steps, and the steps are processed by software including the OS. Thus, the process routine of the interrupt INTS needs considerable time. If the number of interrupts INTS increases, a short period of time is required for a central processing unit (CPU) to process a user's task, and thus the performance of the entire system is degraded accordingly. Therefore, the performance of the entire system can be improved by processing as much data as possible by a single generation of an interrupt INTS.

FIG. 2 is a conceptual view of a conventional method of generating interrupts having delays.

In the conventional method of generating interrupts having delays, if interrupts have to be generated after a first data frame DF1 is received, the interrupts are generated after a time delay TD.

Firstly, as shown in sequence (i), data frames DF1 to DF3 are received. The time delay TD is estimated in response to the first data frame DF1. The time delay TD is stored in a control and status register (CSR) in the NIC 100 (not shown)

so that the device driver 150 can control the time delay TD. The time delay TD is longer than the time necessary for receiving one data frame DF.

Even though the first data frame DF1 is received, the interrupt INTS is generated after the time delay TD. Since the received data frames DF1 and DF2 are sent to the system by the DMA unit 113 during the time delay TD, more data frames DF can be transmitted by a single generation of the interrupt.

Also, as shown in sequence (ii) of FIG. 2, the first and second data frames DF1 and DF2 can be processed by generating an interrupt once, thus it is not necessary to generate an interrupt INTS for the second data frame DF2. Here, "TP" denotes a time delay TD from generation of the interrupt INTS to calling of the process routine of the interrupt INTS from the device driver 115.

FIG. 3 is a conceptual view of another conventional method of generating interrupts having a time delay TD.

In this method, when the predetermined number of data frames DF is received, the interrupts are generated before the time delay TD is passed. Here, the maximum number of data frames DF to be received, e.g., N, is stored in the CSR and is controlled.

The device driver 150 determines whether the number of data frames DF is equal to N if the time delay TD has not passed. Here, N is smaller than the number of data frames DF that can fill the second memory Rx Queue 140 before the time delay TD is passed.

If the number of data frames DF equals N before the time delay TD is passed, the interrupt INTS is generated. If the time delay TD has passed before the number of data frames DF equals N, the interrupt INTS is also generated.

As shown in FIG. 3, if the data frame DF, e.g., data frames DF1-DF4, of the predetermined number (here, 4) is received before the time delay TD is passed, the interrupt INTS is generated so that it is possible to prevent the data frame DF from being retained without being processed.

However, if a time interval between the data frames is long, the time necessary for processing the first data frame is lengthened.

SUMMARY OF THE INVENTION

According to one aspect of the present invention, a method of generating an interrupt which minimizes the number of interrupts occurring during receipt of data frames in a network interface card and processes many data frames by a single generation of interrupts is provided.

According to another aspect of the present invention, a network interface card which minimizes the number of interrupts occurring during receipt of data frames and processes many data frames by a single generation of interrupts is provided.

According to a first embodiment of the present invention, there is provided a method of generating interrupts of a network interface card which transceives data, the method comprising (a) receiving data frames; (b) estimating a first time delay and a second time delay in response to a received data frame and counting a number of received data frames; (c) determining whether the first time delay has passed and generating an interrupt if the first time delay has passed; (d) counting the number of data frames if the first time delay has not passed and generating the interrupt if the number of data frames equals N; (e) determining whether the second time delay has passed if the number of data frames is not equal to N and generating the interrupt if the second time delay has passed, or going back to step (b) if the second time delay has not passed; (f) stopping operations of estimating the first and second time delays and counting the number of data frames in response to the interrupts generated, and transmitting the received data frames; and (g) receiving a new data frame and going back to step (b). The first time delay starts from when a first data frame is received. The second time delay is a time interval between received data frames and is shorter than the first time delay.

According to a second embodiment of the present invention, there is provided a method of generating interrupts of a network interface card which transceives data, the method comprising (a) receiving data frames; (b) estimating a packet time delay in response to the received data frames; (c) determining whether the packet time delay has passed and generating an interrupt if the packet time delay has passed, or going back step (b) if the packet time delay has not passed; (d) stopping an operation of estimating the packet time delay and transmitting the received data frames; and (e) receiving a new data frame and going back to step (b). The packet time delay is a time interval between received data frames.

According to a third embodiment of the present invention, there is provided a method of generating interrupts of a network interface card which transceives data, the method comprising (a) receiving data frames; (b) estimating a first time delay in response to the received data frames, counting a number of received data frames, and recognizing a type field of the received data frames; (c) determining whether the first time delay has passed and generating an interrupt if the first time delay has passed; (d) counting the number of received data frames and generating the interrupt if the number of received data frames is N; (e) determining whether a type field is identical to a predetermined type field if the number of data frames is not equal to N, generating the interrupt if the type field is identical to the predetermined type field, or going back to step (b) if the type field is not identical to the predetermined type field; (f) stopping operations of estimating the first time delay, counting the number of received data frames and recognizing the type field of the data frame in response to the interrupts generated, and transmitting the received data frames; and (g) receiving a new data frame and going back to step (b). The first time delay starts from when the first data frame is received.

According to a fourth embodiment of the present invention, there is provided a method of generating interrupts of a network interface card which transceives data, the method comprising (a) receiving data frames; (b) recognizing a type field of the received data frames; (c) determining whether the type field of the received data frames is identical to a predetermined type field and generating an interrupt if the type field is identical to the predetermined type field or going back to step (b) if the type field is not identical to the predetermined type field; (d) stopping an operation of recognizing the type field of the received data frames in response to the generated interrupt and transmitting the received data frames; and (e) receiving a new data frame and going back to step (b).

According to a fifth embodiment of the present invention, there is provided a method of generating interrupts of a network interface card which transceives data, the method comprising (a) receiving data frames; (b) estimating a first time delay in response to the received data frames, counting a number of received data frames, and recognizing a protocol field of a packet header in a data field of the received data frames; (c) determining whether the first time delay has passed and generating an interrupt if the first time delay has passed; (d) determining whether the number of received data frames is equal to N if the first time delay has not passed and generating the interrupt if the number of data frames is equal to N; (e) determining whether the protocol field is identical to a predetermined protocol field if the number of received data frames is not equal to N, generating the interrupt if the protocol field is identical to the predetermined protocol field, or going back to step (b) if the protocol field is not identical to the predetermined protocol field; (f) stopping operations of estimating the first time delay, counting the number of received data frames and recognizing the protocol field in response to the generated interrupts, and transmitting the received data frames; and (g) receiving a new data frame and going back to step (b).

The first time delay starts from when a first data frame is received.

According to a sixth embodiment of the present invention, there is provided A method of generating interrupts of a network interface card which transceives data, the method comprising (a) receiving data frames; (b) recognizing a protocol field of a packet header in a data field of the received data frames; (c) determining whether the protocol field is identical to a predetermined protocol field and generating an interrupt if the protocol field is identical to the predetermined protocol field, or going back to step (b) if the protocol field is not identical to the predetermined protocol field; (d) stopping an operation of recognizing the protocol field and transmitting the received data frames; and (e) receiving a new data frame and going back to step (b).

According to a seventh embodiment of the present invention, there is provided a method of generating interrupts of a network interface card which transceives data, the method comprising (a) receiving data frames; (b) estimating a first time delay and a second time delay in response to the received data frames, counting a number of received data frames, recognizing a type field of the received data frames, and recognizing a protocol field of a packet header in a data field of the received data frames; (c) determining whether the first time delay has passed and generating an interrupt if the first time delay has passed; (d) counting the number of received data frames if the first time delay has not passed and generating the interrupt if the number of received data frames is equal to N; (e) determining whether the second time delay has passed if the number of received data frames is not equal to N and generating the interrupt if the second time delay has passed; (f) determining whether a type field is identical to a predetermined type field if the second time delay has not passed and generating the interrupt if the type field is identical to the predetermined type field; (g) determining whether the protocol field of the received data frames is identical to a predetermined protocol field if the type field is not identical to the predetermined type field and generating the interrupt if the protocol field is identical to the predetermined protocol field, or going back to step (b) if the protocol field is not identical to the predetermined protocol field; (h) stopping operations of estimating the first time delay and the second time delay, counting the number of received data frames and recognizing the type field and the protocol field of the data frames in response to the generated interrupt, and transmitting the received data frames; and (i) receiving a new data frame and going back to step (b). The first time delay starts from when a first data frame is received. The second time delay is a time interval between the received data frames and is shorter than the first time delay.

According to an eighth embodiment of the present invention, there is provided a network interface card which minimizes the number of times where interrupts are generated, the network interface card comprises: a first time delay estimating circuit which estimates a first time delay in response to received data frames and stops estimating the first time delay in response to an interrupt; a second time delay estimating circuit which estimates a second time delay in response to the received data frames and stops estimating the second time delay in response to the interrupt; a data frame counting circuit which counts a number of received data frames in response to the received data frames and stops counting the data frames in response to the interrupt; a determining circuit which determines whether the time reaches the first time delay in response to an output signal of the first time delay estimating circuit, determines whether the time reaches the second time delay in response to an output signal of the second time delay estimating circuit, determines whether the number of received data frames is equal to N in response to an output signal of the data frame counting circuit, and generates an interrupt control signal for controlling generation of the interrupt; and an interrupt generating circuit which generates the interrupt in response to the interrupt control signal. The first time delay is estimated from when a first data frame is received. The second time delay is a time interval between the received data frames and is shorter than the first time delay.

The network interface card further comprises a receiving circuit, which receives data frames and transmits the received data frames to the first time delay estimating circuit, the second time delay circuit, and the data frame counting circuit; and a transmitting circuit, which receives and transmits the interrupt.

According to a ninth embodiment of the present invention, there is provided a network interface card which minimizes the number of times where interrupts are generated, the network interface card comprises a first time delay estimating circuit which estimates a first time delay in response to received data frames and stops estimating the first time delay in response to an interrupt; a type recognizing circuit which recognizes a type field of data frames in response to the received data frames and stops recognizing the type field in response to the interrupt; a data frame counting circuit which counts a number of received data frames in response to the received data frames and stops counting the number of received data frames in response to the interrupts; a determining circuit which determines whether the first time delay estimating circuit reaches a time delay in response to the output signal of the first time delay estimating circuit, determines whether the number of received data frames is equal to N in response to an output signal of the data frame counting circuit, determines whether the type field recognized in response to an output signal of the type recognizing circuit is identical to a predetermined type field, and generates an interrupt control signal for controlling generation of the interrupt; and an interrupt generating circuit which generates the interrupt in response to the interrupt control signal. The first time delay starts from when a first data frame is received.

According to a tenth embodiment of the present invention, there is provided a network interface card which minimizes the number of times where interrupts are generated, the network interface card comprises a first time delay estimating circuit which estimates a first time delay in response to received data frames and stops estimating the first time delay in response to an interrupt; a protocol recognizing circuit which recognizes a protocol field of a packet header in a data field of the received data frames in response to the received data frames and stops recognizing the protocol field in response to the interrupt; a data frame counting circuit which counts a number of received data frames in response to the received data frames and stops counting the number of received data frames in response to the interrupt; a determining circuit which determines whether the first time delay estimating circuit reaches a time delay in response to the output signal of the first time delay estimating circuit, determines whether the number of received data frames is equal to N in response to an output signal of the data frame counting circuit, determines whether the protocol field recognized in response to an output signal of the type recognizing circuit is identical toga predetermined type field, and generates an interrupt control signal for controlling generation of the interrupt; and an interrupt generating circuit which generates the interrupt in response to the interrupt control signal. The first time delay is estimated from when a first data frame is received.

According to an eleventh embodiment of the present invention, there is provided claim a network interface card which minimizes the number of times where interrupts are generated, the network interface card comprises a first time delay estimating circuit which estimates a first time delay in response to the received data frames and stops estimating the first time delay in response to an interrupt; a second time delay estimating circuit which estimates a second time delay in response to received data frames and stops estimating the second time delay in response to the interrupt; a type recognizing circuit which recognizes a type field of data frames in response to the received data frames and stops recognizing the type field in response to the interrupt; a data frame counting circuit which counts a number of received data frames in response to the received data frames and stops counting the number of received data frames in response to the interrupt; a protocol recognizing circuit which recognizes a protocol field of a packet header in a data field of the received data frames in response to the received data frames and stops recognizing the protocol field in response to the interrupt; a determining circuit which determines whether the first time delay has passed in response to the output signal of the first time delay estimating circuit, determines whether the second time delay has passed in response to an output signal of the second time delay estimating circuit, determines whether the type field recognized in response to an output signal of the type recognizing circuit is identical to a predetermined type field, determines whether the number of received data frames is equal to N in response to an output signal of the data frame counting circuit, determines whether the protocol field recognized by the protocol recognizing circuit in response to an output signal of the protocol recognizing circuit and generates an interrupt control signal for controlling generation of the interrupt; and an interrupt generating circuit which generates the interrupt in response to the interrupt control signal. The first time delay starts from when a first data frame is received. The second time delay is a time interval between the received data frames and is shorter than the first time delay.

The network interface card further comprises a receiving circuit, which receives data frames and transmits the received data frames to the first time delay estimating circuit, the second time delay circuit, the data frame counting circuit, the type recognizing circuit, and the protocol recognizing circuit; and a transmitting circuit, which receives and transmits the interrupt.

BRIEF DESCRIPTION OF THE DRAWINGS

The above and other features and advantages of the present invention will become more apparent by describing in detail exemplary embodiments thereof with reference to the attached drawings in which.

DETAILED DESCRIPTION OF THE INVENTION

Figure 1:
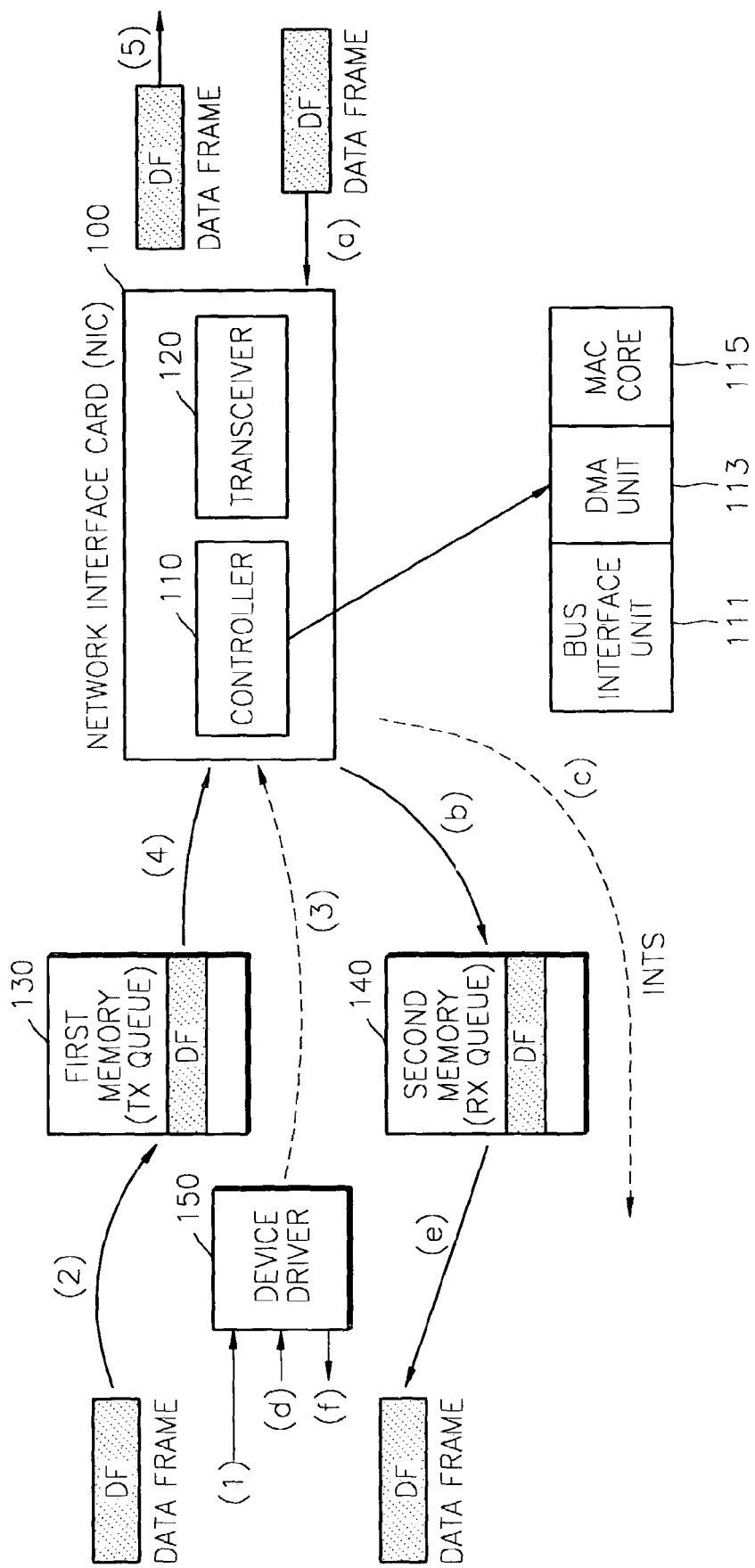
FIG. 1 shows the operation of a controller of a network interface card.
Figure 2:
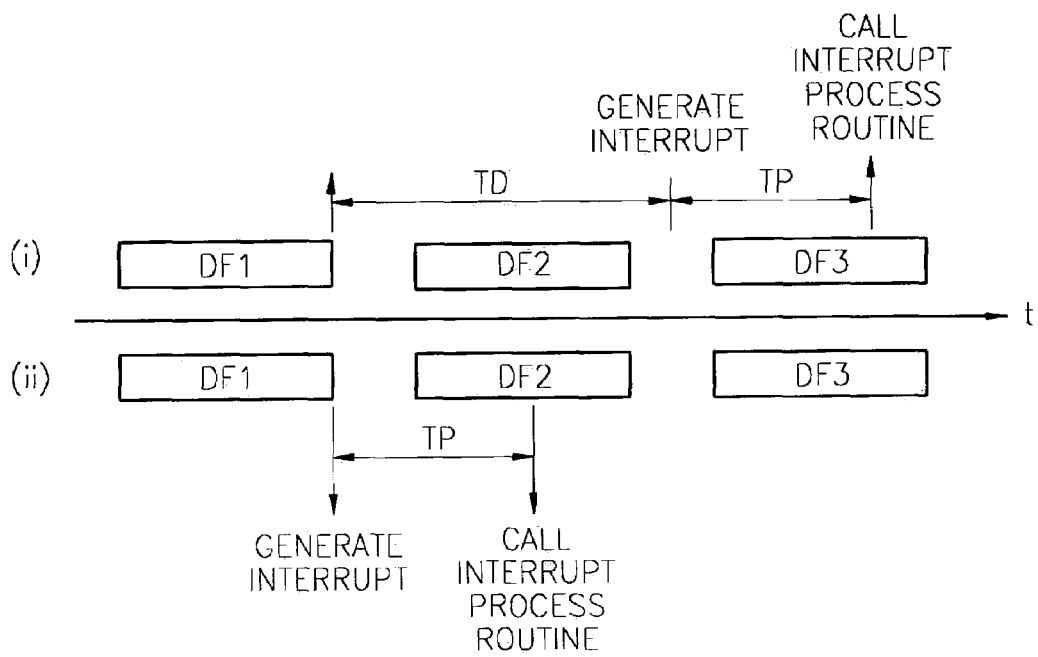
FIG. 2 is a conceptual view of a conventional method of generating interrupts having delays.
Figure 3:
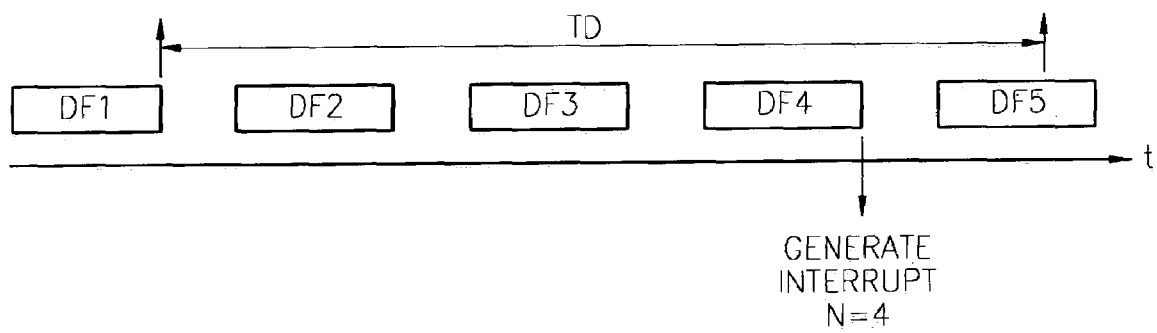
FIG. 3 is a conceptual view of another conventional method of generating interrupts having delays.

The present invention now will be described more fully with reference to the accompanying drawings, in which preferred embodiments of the invention are shown. Like reference numerals are used to refer to like elements throughout.

Figure 4:
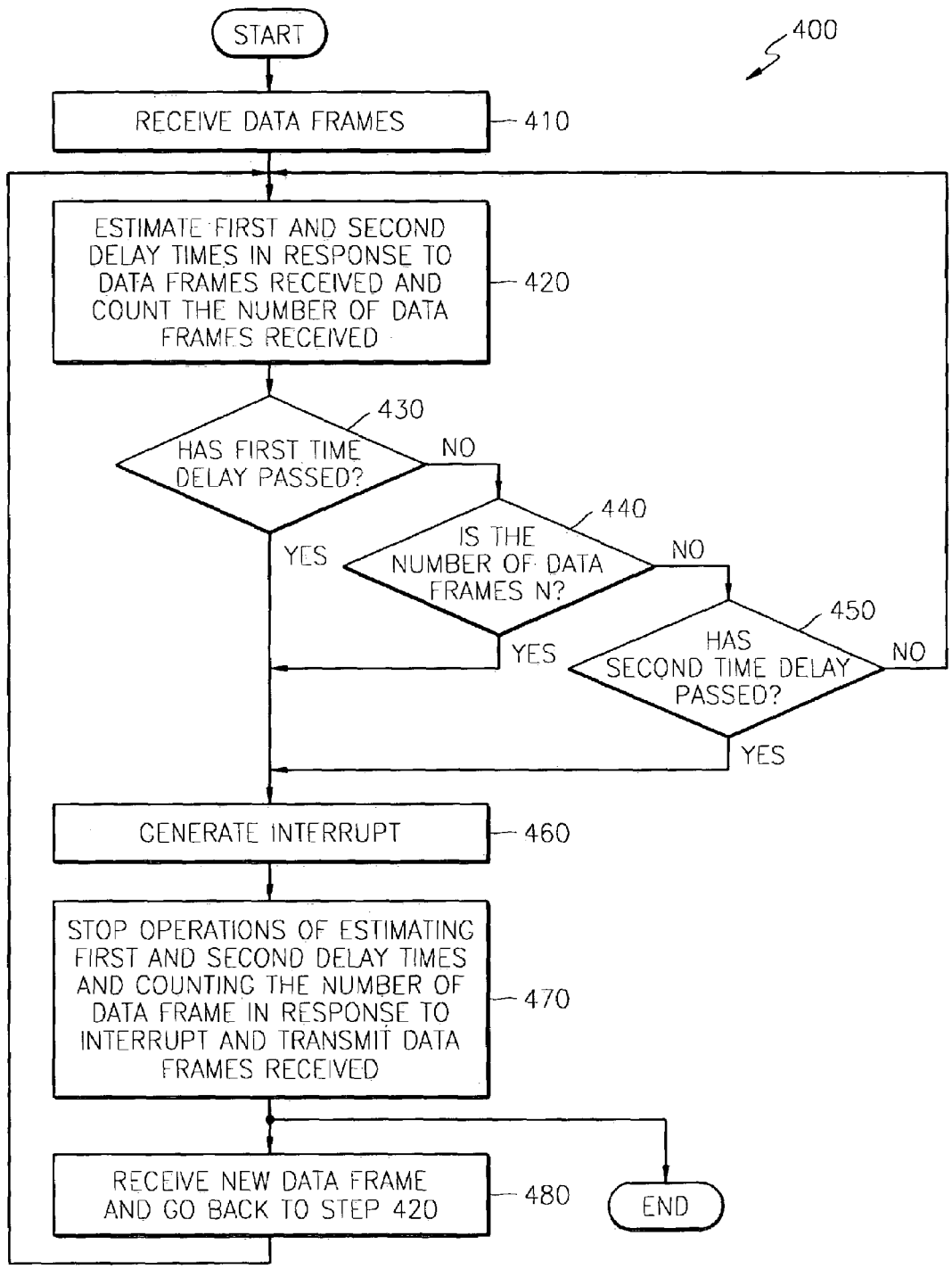
FIG. 4 is a flowchart illustrating a method of generating interrupts according to a first embodiment of the present invention.

FIG. 4 is a flowchart illustrating a method of generating interrupts according to a first embodiment of the present invention.

Figure 5:
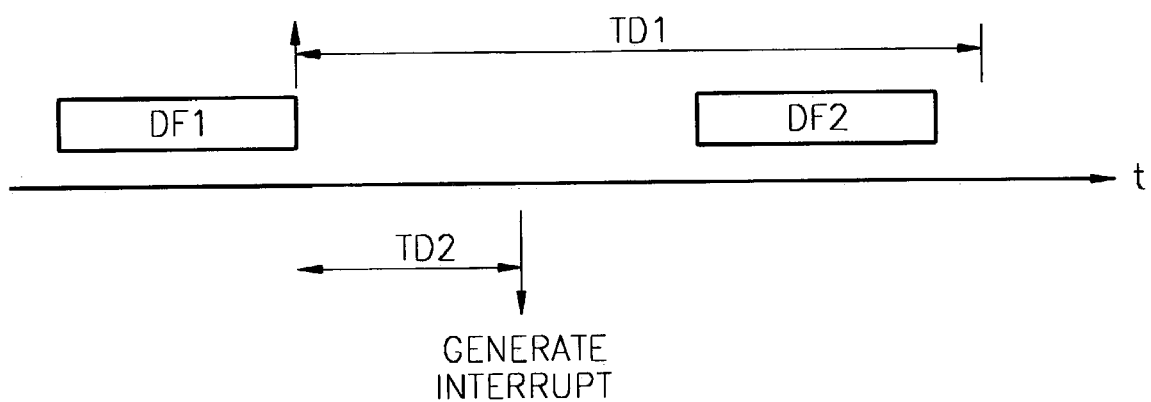
FIG. 5 is a conceptual view of the method of generating interrupts of FIG. 4.

FIG. 5 is a conceptual view of the method of generating interrupts of FIG. 4.

Referring to FIGS. 4 and 5, in a method of generating interrupts of a network interface card (NIC) which transceives data, the method 400 includes receiving data frames (step 410), estimating a first time delay TD1 and a second time delay TD2 in response to a received data frame and counting the number of received data frames (step 420), determining whether the first time delay TD1 has passed (step 430), generating an interrupt if the time reaches the first delay time TD1 (step 460), counting the number of data frames if the first time delay TD1 has not passed (step 440), generating an interrupt if the number of data frames is N (step 460), determining whether the time reaches the second time delay TD2 if the number of data frames is not N, generating an interrupt if the second time delay TD2 has passed or going back to step 420 if the second time delay TD2 has passed (steps 450 and 460), stopping estimation of the first and second time delays TD1 and TD2, stopping counting the number of data frames in response to the interrupt generated, transmitting received data frames (step 470), receiving new data frames and going back to step 420 (step 480).

The first time delay TD1 starts from when a first data frame is received. The second time delay TD2 is a time interval between received data frames and is shorter than the first time delay TD1.

Referring to FIGS. 4 and 5, the method of generating interrupts according to the first embodiment of the present invention will be described in detail.

If the time interval between the received data frames DF1 and DF2 is long and the first time delay TD1 is set to be long, the time necessary for processing the first data frame DF1 is lengthened. To shorten the time necessary for processing the first data frame DF1, if the time interval between the data frames DF1 and DF2 is longer than a certain period of time, interrupts are generated such that the first data frame DF1 is processed according to the method of FIG. 4.

In steps 410 through 430, the first data frame DF1 is received and the first time delay TD1 is estimated. The first time delay TD1 starts from when the first data frame DF1 is received. If the first time delay TD1 has passed, an interrupt is generated. If the first time delay TD1 has passed, it is determined whether the number of data frames DF equals N (step 440). If the number of data frames equals N, an interrupt is generated to process data because the predetermined number of data frames is accumulated. If the number of data frames is not equal to N, it is determined whether the time reached the second time delay TD2 (step 450). The second time delay TD2 is the time interval between the received data frames DF1 and DF2 and is shorter than the first time delay TD1.

After the first data frame DF1 is received, if the second data frame DF2 is not received before the end of the second time delay TD2, an interrupt is generated at the end of the second time delay TD2. If the second data frame DF2 is received before the second time delay TD2 expires after the first data frame DF1 is received, the interrupt is not generated, and the second time delay TD2 starts again from when the second data frame DF2 is received. If data frames DF are received before the end of the second time delay TD2, that is, if the time interval between the data frames is shorter than the second time delay TD2, the interrupt is generated when the time reaches the end of the first time delay TD1 or the number of received data frames equals N.

The second time delay TD2 may be measured by, but not limited to, a timer.

If interrupts are generated, operations of estimating the first and the second time delays TD1 and TD2 and counting the data frames DF are stopped in response to the interrupts generated, and the received data frame DF1 is transmitted to an upper layer protocol (step 470). After transmission of the received data frame DF1 is completed, the second data frame DF2 is received to estimate the first and the second time delays TD1 and TD2 and to start step 420 of counting the number of data frames (step 480).

Referring to FIG. 5, since the second data frame DF2 is not received before the end of the second time delay TD, an interrupt is generated after the end of the second time delay TD2.

Figure 6:
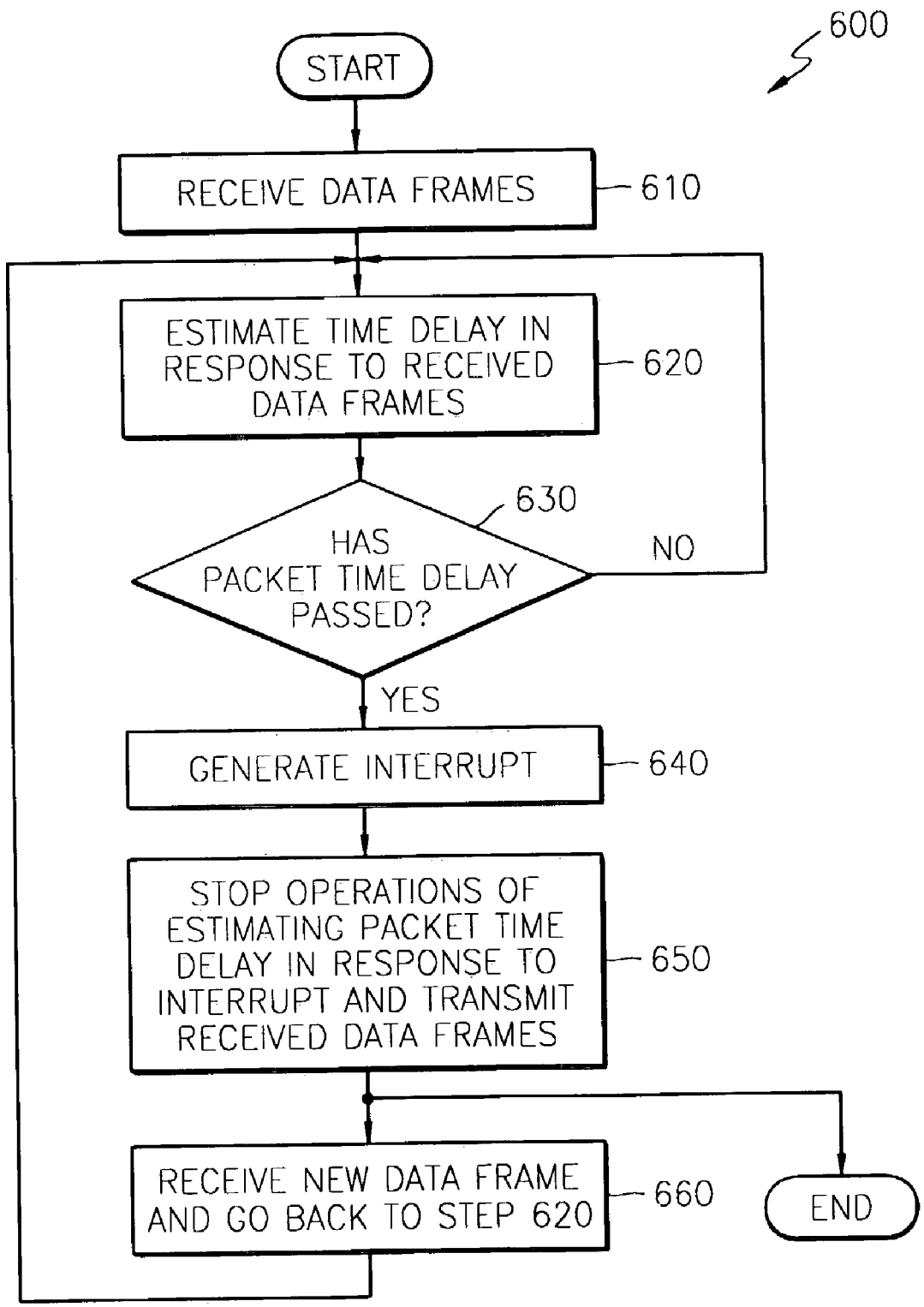
FIG. 6 is a flowchart illustrating a method of generating interrupts according to a second embodiment of the present invention.

FIG. 6 is a flowchart illustrating a method of generating interrupts according to a second embodiment of the present invention.

Referring to FIG. 6, a method of generating interrupts 600 of a NIC which transceives data includes receiving data frames (step 610); estimating a packet time delay in response to the received data frames (step 620); determining whether the packet time delay has passed (step 630); generating interrupts if the time reaches the packet time delay or going back to step 620 if the time does not reach the packet time delay (step 640); stopping the operation of estimating the packet time delay and transmitting the received data frames (step 650); receiving a new data frame and going back to step 620 (step 660).

The packet time delay is a time interval between received data frames.

Hereinafter, the method of generating interrupts according to the second embodiment will be described with reference to FIG. 6.

The method of generating interrupts 600 according to the second embodiment of the present invention uses the second time delay TD2 of the method of generating interrupts 400 according to the first embodiment of the present invention. That is, the packet time delay is substantially the same as the second time delay TD2 of the first embodiment of the present invention.

A data frame is received, and a packet time delay is estimated (steps 610 and 620). It is determined whether the packet time delay has passed or expired (step 630). The packet time delay is the time interval between the received data frames.

If the second data frame is not received during the packet time delay after the first data frame is received, an interrupt is generated at the end of the packet time delay. If the second data frame is received before the end of the packet time delay and after the first data frame is received, the interrupt is not generated, and then the packet time delay starts again from when the second data frame is received.

The packet time delay may be measured by, but not limited to, a timer.

If interrupts are generated, an operation of estimating the packet time delay is stopped in response to the interrupt generated, and the received data frame is transmitted to the upper layer protocol (step 650). After the received data frame is transmitted, a new data frame is received, and step 620 of estimating the packet time delay is started (step 660).

Figure 7:
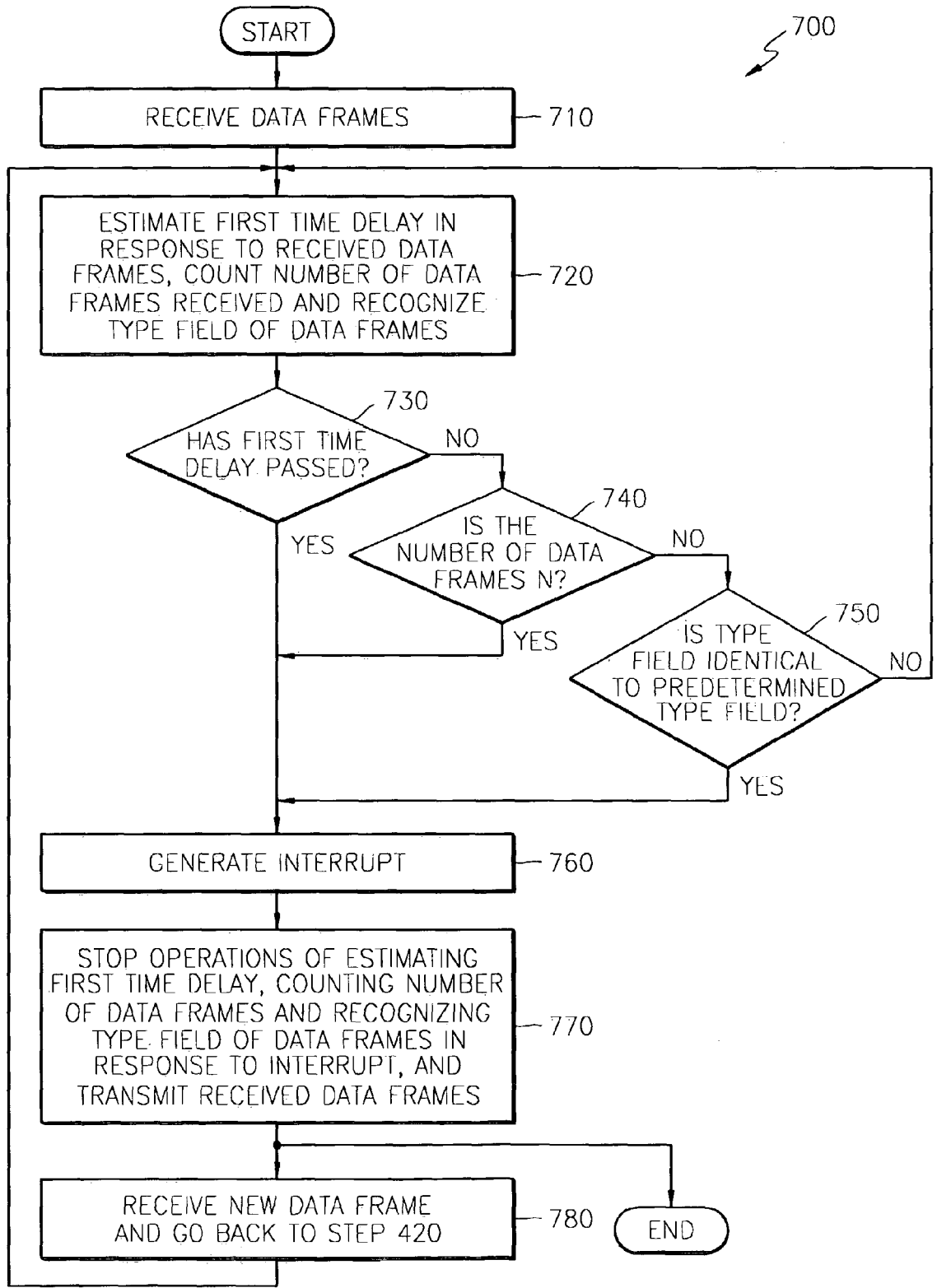
FIG. 7 is a flowchart illustrating a method of generating interrupts according to a third embodiment of the present invention.

FIG. 7 is a flowchart illustrating a method of generating interrupts according to the third embodiment of the present invention.

Referring to FIG. 7, a method of generating interrupts 700 of a NIC which transceives data includes receiving data frames (step 710); estimating a first time delay in response to the received data frames, counting the number of received data frames, and recognizing a type field of the received data frames (step 720); determining whether the first time delay has passed and generating an interrupt if the first time delay has passed (steps 730 and 760); counting the number of received data frames and generating an interrupt if the number of received data frames equals N (steps 740 and 760); determining whether a type field is identical to a predetermined type field, if the number of data frames is not equal to N and generating interrupts if the type field is identical to the predetermined type field, or going back to step 720 if the type field is not identical to the predetermined type field (steps 750 and 760); stopping operations of estimating the first time delay, counting the number of data frames and recognizing the type field of the data frame in response to the interrupt generated, and transmitting the received data frames (step 770); receiving a new data frame, and going back to step 720 (step 780).

The first time delay starts from when the first data frame is received.

Hereinafter, the method of generating interrupts according to the third embodiment of the present invention will be described in detail with reference to FIG. 7.

Among the received data frames, there are several data frames that have to be processed within a predetermined time. If such data frames that are predetermined are received, they are recognized, thus interrupts are generated.

There are several fields, e.g., a destination address field, a source address field, a type field, a data field, a cyclic redundancy check (CRC) field, and the like, in data frames. In each field, destination addresses, source addresses, types, data, cyclic redundancy checks (CRC), and the like are stored respectively. In the type field, information on the type of data of a data frame is stored.

The type of data that has to be processed within a certain time is predetermined, and a type field is searched for. If a searched type field is identical to the predetermined type field, interrupts are generated.

Here, the predetermined type field can be stored in the CSR register of the NIC.

Data frames are received, and a first time delay is estimated (steps 710 and 720). The first time delay starts from when a first data frame is received. It is determined whether the time reaches the first time delay, and an interrupt is generated if the time reaches the first time delay (steps 730 and 760). If the time does not reach the first time delay, it is determined whether the number of data frames is equal to N (step 740). If the number of data frames is equal to N, the interrupt is generated to process data because the predetermined number of data frames is accumulated. If the number of data frames is not equal to N, it is determined whether the type field is identical to the predetermined type field (step 750). The type field is placed in a predetermined location of the data frame. In general, the destination address field and the source address field combined have a length of 12 bytes. The type field, has a length of 2 bytes. Thus, the 2-bytes, which follow 12-bytes, of the received data frame is the type field which is compared to the predetermined type field.

If the type field of the received data frames is identical to the predetermined type field, interrupts are generated. If the type field of the received data frames is not identical to the predetermined type field, interrupts are generated after the time passes the first time delay or at the moment when the number of accumulated data frames is equal to N.

To recognize the type field, an additional type recognizing circuit is needed. The type recognizing circuit recognizes a location of the type field in the received data frames and determines whether the type field in the received data frames is identical to a predetermined type field.

If interrupts are generated, operations of estimating a first time delay, counting the number of data frames, and recognizing the type field are stopped, and the received data frames are transmitted to the upper layer protocol (step 770). After transmission of the received data frames is completed, a new data frame is received, and the process goes back to step 720 of estimating the first time delay, counting the number of data frames, and recognizing the type field (step 780).

Figure 8:
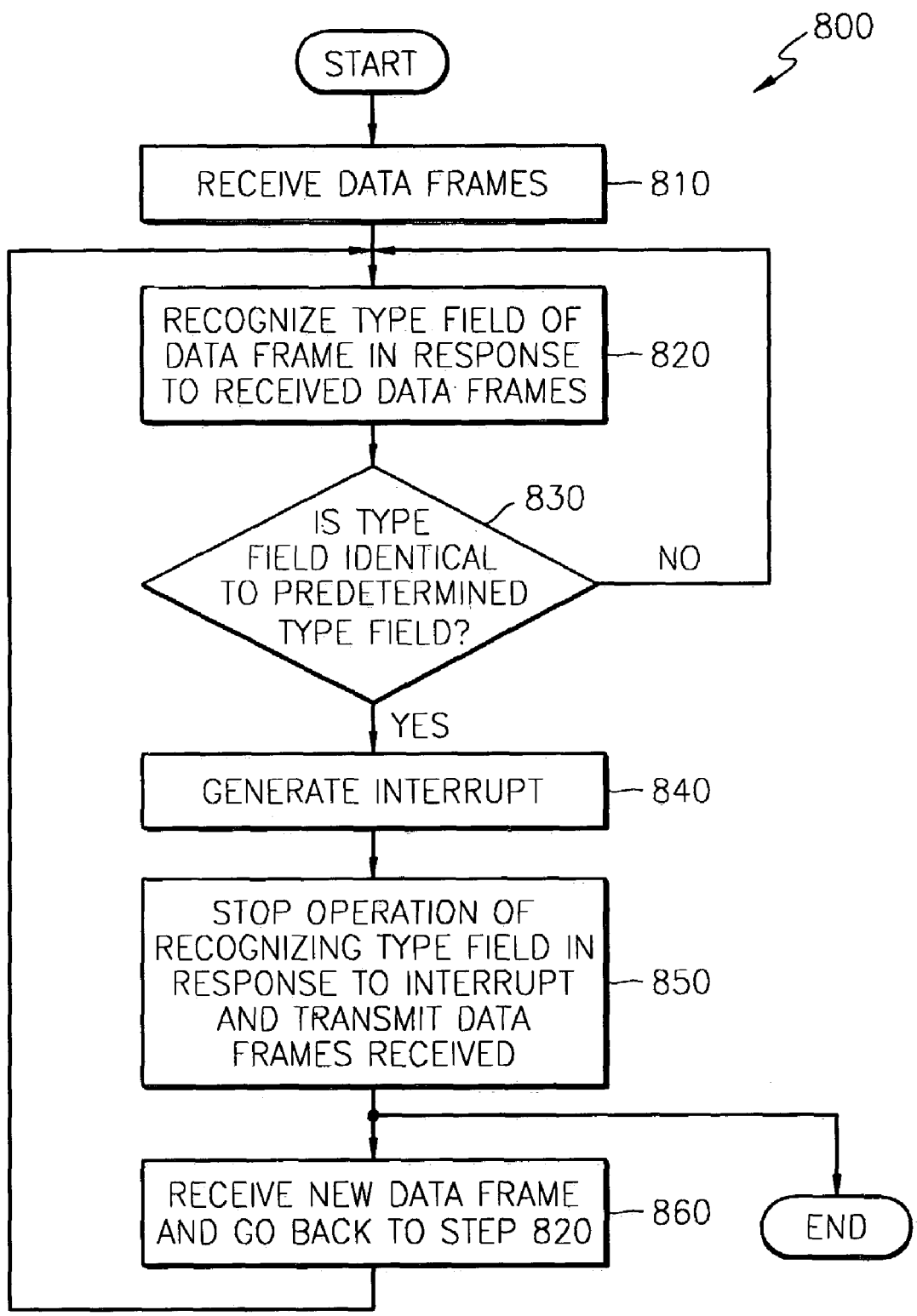
FIG. 8 is a flowchart illustrating a method of generating interrupts according to a fourth embodiment of the present invention.

FIG. 8 is a flowchart illustrating a method of generating interrupts according to a fourth embodiment of the present invention.

Referring to FIG. 8, a method of generating interrupts 800 of a network interface card (NIC) that transceives data includes receiving data frames (step 810); recognizing a type field of the received data frames (step 820); determining whether the type field of the received data frames is identical to a predetermined type field (steps 830); generating an interrupt if the type field is identical to the predetermined type field or going back to step 820 if the type field is not identical to the predetermined type field (step 840); stopping recognizing the type field of the received data frames in response to the generated interrupt and transmitting the received data frames (step 850); receiving a new data frame and going back to step 820 (step 860).

Hereinafter, the method of generating interrupts according to the fourth embodiment of the present invention will be described in detail with reference to FIG. 8.

The method of generating interrupts 800 according to the fourth embodiment of the present invention relates to recognizing the type field of the data frames of the method of generating interrupts 700 according to the third embodiment of the present invention.

Among the received data frames, there are several data frames that have to be processed within a predetermined time. If such data frames that are predetermined are received, they are recognized, and thus interrupts are generated.

The type of data that has to be processed within a certain time is predetermined, and a type field is searched for. If a searched type field is identical to the predetermined type field, interrupts are generated.

Here, the predetermined type field can be stored in the CSR register of the NIC.

Data frames are received in step 810. A type field of the received data frames is recognized in step 820. It is determined whether the type field of the received data frames is identical to a predetermined type field in step 830. The type field is placed in a predetermined location in the data frame. In general, the destination address field and the source address field combined have a length of 12 bytes. The type field has a length of 2 bytes. Thus, the 2-bytes, which follow 12-bytes, of the received data frame is the type field which is compared to the predetermined type field.

Interrupts are generated if the type field of the received data frames is identical to the predetermined type field (step 840).

To recognize the field types, an additional type recognizing circuit is needed. The type recognizing circuit recognizes a location of the type field in the received data frames and determines whether the type field in the received data frames is identical to the predetermined type field.

If interrupts are generated, an operation of recognizing the type field is stopped, and the received data frames are transmitted to the upper layer protocol (step 850). After transmission of the received data frames is completed, a new data frame is received and the process goes back to step 820 to recognize a type field of the new data frame (step 860).

Figure 9:
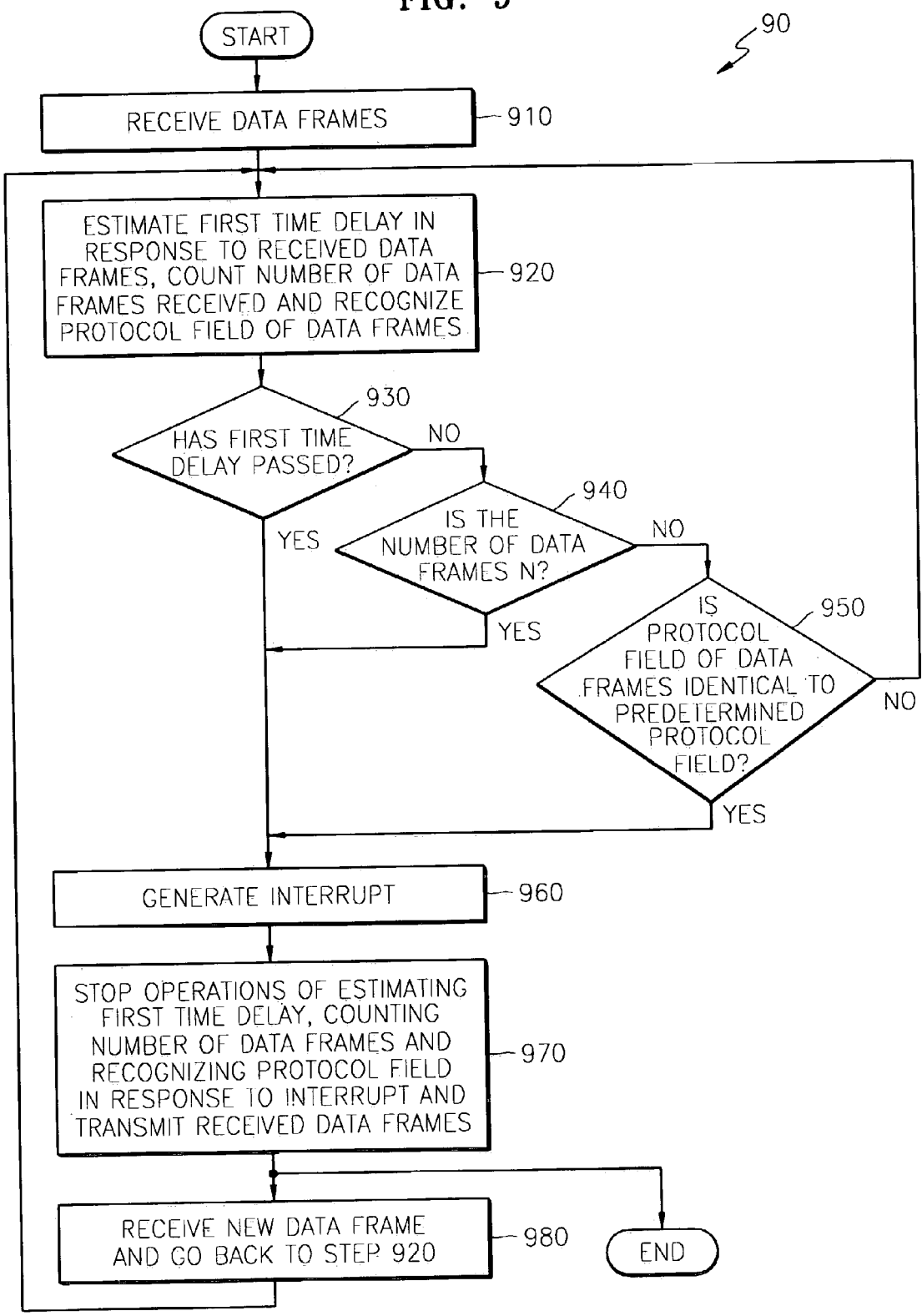
FIG. 9 is a flowchart illustrating a method of generating interrupts according to a fifth embodiment of the present invention.

FIG. 9 is a flowchart illustrating a method of generating interrupts according to a fifth embodiment of the present invention.

Referring to FIG. 9, a method of generating interrupts 900 of a network interface card (NIC) that transceives data includes receiving data frames (step 910); estimating a first time delay in response to the received data frames, counting the number of received data frames, and recognizing a protocol field of a packet header in a data field of the received data frames (step 920); determining whether the first time delay has not passed and generating an interrupt if the time reaches the first time delay (step 930); determining whether the number of data frames equals N if the first time delay has not passed and generating the interrupt if the number of data frames equals N (step 940); determining whether the protocol field is identical to a predetermined protocol field if the number of data frames is not equal to N, generating the interrupt if the protocol field is identical to the predetermined protocol field, or going back to step 920 if the protocol field is not identical to the predetermined protocol field (steps 950 and 960); stopping operations of estimating the first time delay, counting the number of data frames and recognizing the protocol field in response to the generated interrupts, and transmitting the received data frames (step 970); and receiving a new data frame and going back to step 920 (step 980). The first time delay starts from when a first data frame is received.

Hereinafter, a method of generating interrupts 900 according to the fifth embodiment of the present invention will be described in detail with reference to FIG. 9.

There are several fields, e.g., a destination address field, a source address field, a type field, a data field, a cyclic redundancy check (CRC) field, and the like, in each data frame. In each field, destination addresses, source addresses, types, data, cyclic redundancy checks (CRC), and the like, are stored respectively as described previously.

A packet, which is generated in a protocol of an upper layer of Ethernet, is placed in the data field. The protocol of the upper layer of Ethernet includes an Internet Protocol (IP), an Internet Control Message Protocol (ICMP), and the like. In particular, IP is most widely used as the upper layer of Ethernet.

An IP packet, which is placed in the data field of the received data frames and is generated from IP, includes two regions, e.g., an IP packet header and IP packet data. In the IP packet header, control information to transmit protocol data stored in the IP packet data is stored.

In the IP packet data, protocol data such as a transmission control protocol (TCP) of an upper layer of the IP or a user datagram protocol (UDP) is stored.

Control information on a type of protocol data stored in the IP packet data is stored in the protocol field.

In the method of generating interrupts 900 according to the fifth embodiment of the present invention, interrupts are generated if the protocol field of the packet header in the data field of the received data frames is identical to a predetermined protocol field. The predetermined protocol field can be set by a user so that interrupts can be urgently generated by the user.

Here, the predetermined protocol field can be stored in the CSR of the NIC.

In the fifth embodiment, a case where the IP packet is included in the data frames is described. However, the case is not limited to the IP packet as included in the data frames.

Data frames are received, and a first time delay is estimated (steps 910 and 920). The first time delay starts from when a first data frame is received. It is determined whether the first time delay has passed, and an interrupt is generated if the first time delay has passed (steps 930 and 960).

If the first time delay has not passed, it is determined whether the number of data frames is equal to N (step 940). If the number of data frames is equal to N, the interrupt is generated to process data because a predetermined number of data frames is accumulated.

If the number of data frames is not equal to N, it is determined whether the protocol field is identical to the predetermined protocol field (step 950). The protocol field is placed in the data field of the data frame. In general, the destination address field and the source address field combined have a length of 12 bytes. The type field has a length of 2 bytes. Thus, the data field begins at the 15$^{th}$ byte of the utmost bits of the received data frames. The protocol field is placed in the packet header of the data field. Thus, it is determined whether the protocol field is identical to the predetermined protocol field.

If the protocol field of the data frames is identical to the predetermined protocol field, interrupts are generated. If the protocol field of the received data frames is not identical to the predetermined protocol field, interrupts are generated after the first time delay has passed or at the moment when the number of data frames is equal to N.

To recognize the protocol field, an additional IP packet recognizing circuit and a protocol field extracting circuit for recognizing the protocol field are needed. The IP packet recognizing circuit determines whether the received data frames include the IP packet.

The protocol field extracting circuit extracts and recognizes the protocol field if the received data frames include the IP packet. The IP packet recognizing circuit and the protocol field extracting circuit can be easily made by those skilled in the art.

If interrupts are generated, operations of estimating a first time delay, counting the number of data frames, and recognizing the type field are stopped in response to the generated interrupts, and the received data frames are transmitted to the upper layer protocol (step 970). After transmission of the received data frames is completed, a new data frame is received, and step 920 of estimating the first time delay, counting the number of data frames, and recognizing the type field starts (step 980).

Figure 10:
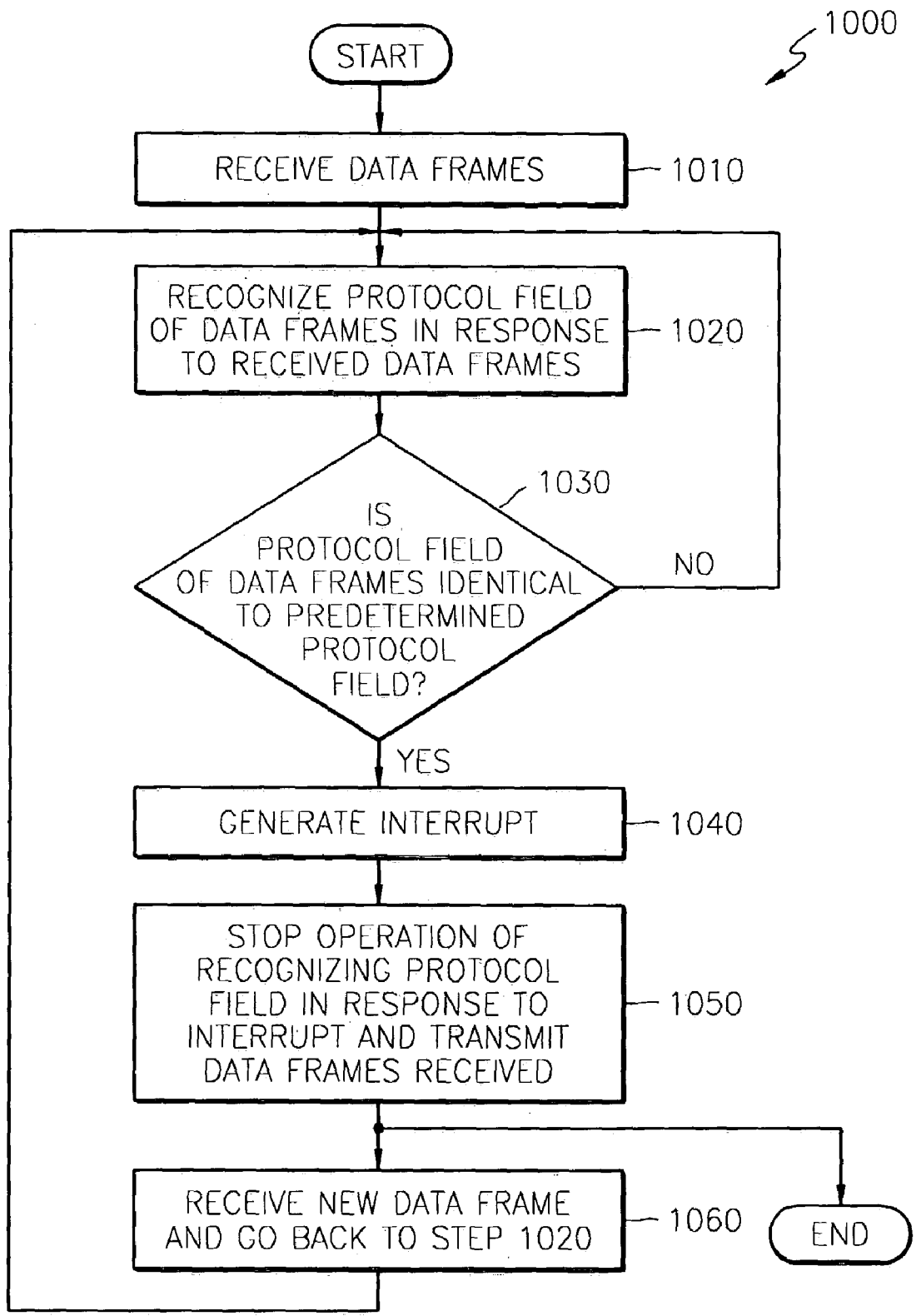
FIG. 10 is a flowchart illustrating a method of generating interrupts according to a sixth embodiment of the present invention.

FIG. 10 is a flowchart illustrating a method of generating interrupts according to the sixth embodiment of the present invention.

Referring to FIG. 10, a method of generating interrupts 1000 of a network interface card (NIC) that transceives data includes receiving data frames (step 1010); recognizing a protocol field of a packet header in a data field of the received data frames (step 1020); determining whether the protocol field is identical to a predetermined protocol field (step 1030); generating an interrupt if the protocol field is identical to the predetermined protocol field or going back to step 1020 if the protocol field is not identical to the predetermined protocol field (step 1040); stopping an operation of recognizing the protocol field, and transmitting the received data frames (step 1050), and receiving a new data frame and going back to step 1020 (step 1060). Hereinafter, a method of generating interrupts 1000 according to a sixth embodiment of the present invention will be described in detail with reference to FIG. 10.

The method of generating interrupts 1000 according to the sixth embodiment of the present invention relates to recognizing the protocol field of the data frames of the method of generating interrupts 900 according to the fifth embodiment of the present invention.

The protocol field is predetermined according to a user's request for urgently generating interrupts. If data frames that include the protocol field are received, they are recognized, thus interrupts are generated.

The data frames are received in step 1010. The protocol field of the data frames is recognized in step 1020. The protocol field exists in a packet header of the data frame. It is determined that whether a protocol field of the data frames is identical to a predetermined protocol field in step 1030. Interrupts are generated if a type field of the received data frames is identical to a predetermined type field in step 1040.

To recognize the protocol field, an additional IP packet recognizing circuit and a protocol field extracting circuit for recognizing the protocol field are needed. The IP packet recognizing circuit determines whether the received data frames include the IP packet.

The protocol field extracting circuit extracts and recognizes the protocol field if the received data frames include the IP packet. The IP packet recognizing circuit and the protocol field extracting circuit can be easily achieved by those skilled in the art.

If interrupts are generated, an operation of recognizing the protocol field is stopped in response to the generated interrupts, and the received data frames are transmitted to the upper layer protocol (step 1050). After transmission of the received data frames is completed, a new data frame is received, and the process goes back to step 1020 of recognizing the protocol field starts (step 1060).

Figure 11:
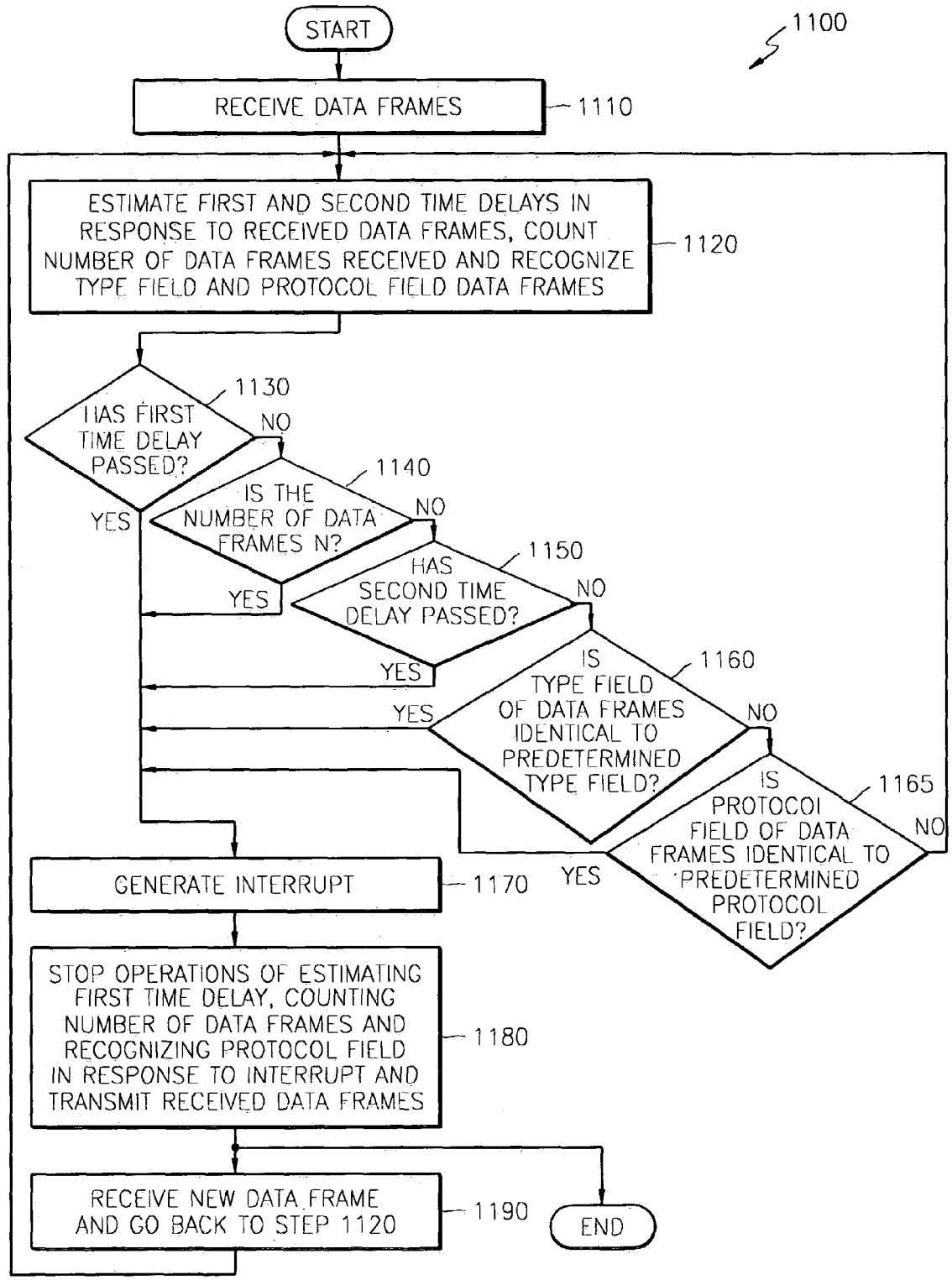
FIG. 11 is a flowchart illustrating a method of generating interrupts according to a seventh embodiment of the present invention.

FIG. 11 is a flowchart illustrating a method of generating interrupts according to a seventh embodiment of the present invention.

Referring to FIG. 11, a method of generating interrupts 1100 of a network interface card (NIC) that transceives data includes receiving data frames (step 1110), estimating a first time delay and a second time delay in response to the received data frames, counting the number of received data frames, recognizing a type field of the received data frames, and recognizing a protocol field of a packet header in a data field of the received data frames (step 1120); determining whether the first time delay has passed and generating an interrupt if the first time delay has passed (steps 1130 and 1170); counting the number of data frames if the first time delay has not passed and generating the interrupt if the number of data frames is equal to N (steps 1140 and 1170); determining whether the second time delay has passed if the number of data frames are not equal to N, and generating interrupts if the second time delay has passed (steps 1150 and 1170); determining whether a type field is identical to a predetermined type field if the second time delay has not passed, and generating interrupts (steps 1160 and 1170); determining whether the protocol field of the received data frames is identical to a predetermined protocol field if the type field is not identical to the predetermined type field, generating interrupts if the protocol field is identical to the predetermined protocol field, or going back to step 1120 if the protocol field is not identical to the predetermined protocol field (steps 1165 and 1170); stopping operations of estimating the first time delay and the second time delay, counting the number of data frames and recognizing the type field and the protocol field of the data frames in response to the generated interrupts, and transmitting the received data frames (step 1180); and receiving a new data frame, and going back to step 1120 (step 1190).

The first time delay starts from when a first data frame is received. The second time delay is a time interval between the received data frames and is shorter than the first time delay.

Hereinafter, a method of generating interrupts 1100 according to the seventh embodiment of the present invention will be described in detail with reference to FIG. 11.

The method of generating interrupts 1100 according to the seventh embodiment of the present invention is created by combining the method of generating interrupts 700 according to the third embodiment of the present invention with the method of generating interrupts 900 according to the fifth embodiment of the present invention.

That is, the method of generating interrupts 1100 according to the seventh embodiment of the present invention includes a method of generating interrupts to prevent the received data frames from being accumulated without being processed after the time interval between the received data frames is greater than a predetermined time; a method of generating interrupts by predetermining a type field of data that has to be processed within the predetermined time and recognizing whether the data frames having the data are received; and a method of recognizing a protocol field in the data field of the data frames and generating interrupts if the protocol field is identical to a predetermined protocol field.

The methods of generating interrupts 400, 700, and 900 have already been described, and thus the method of generating interrupts 1100 will not be described.

Figure 12:
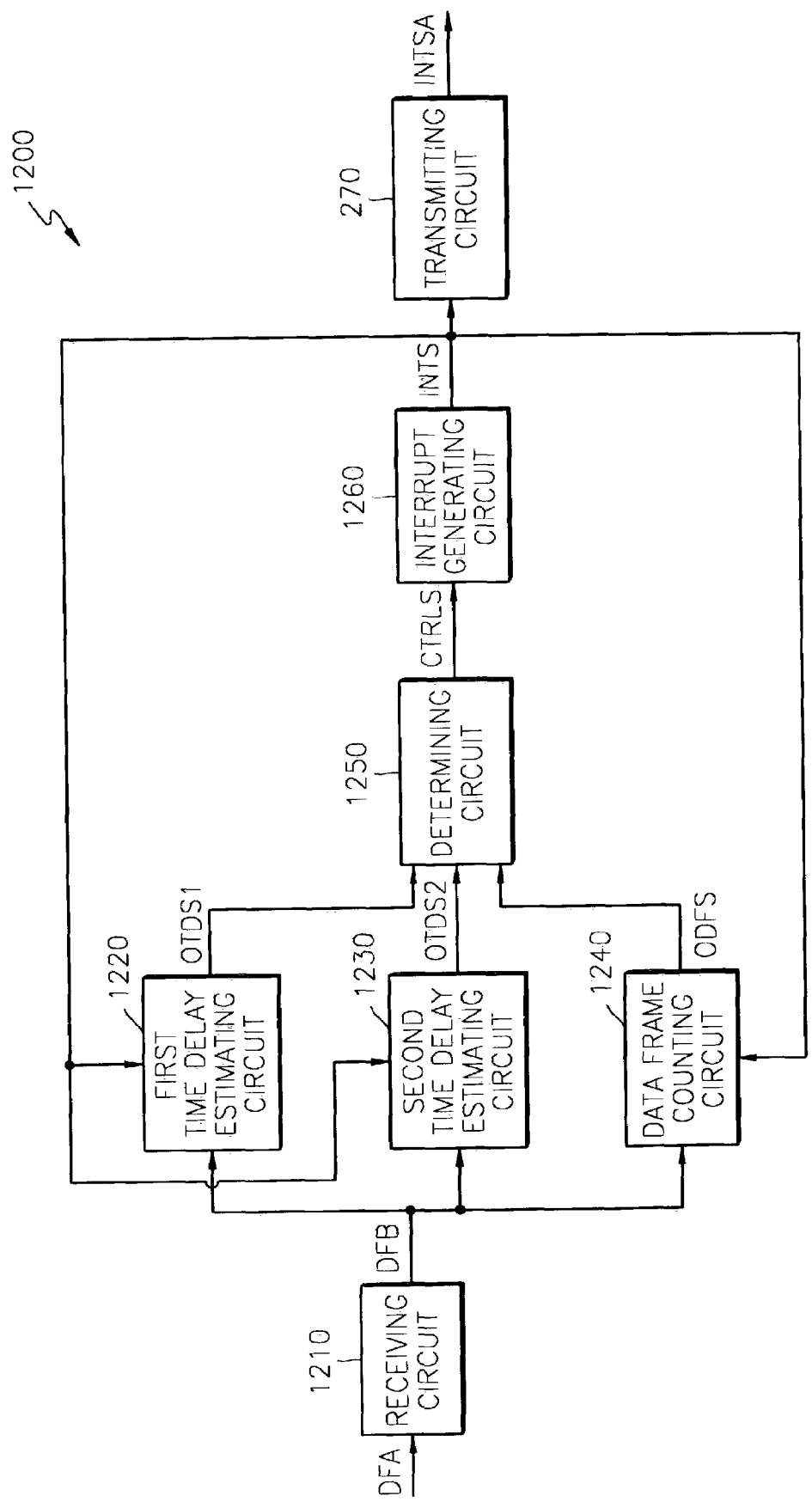
FIG. 12 is a block diagram illustrating a network interface card according to an eighth embodiment of the present invention.

FIG. 12 is a block diagram illustrating a network interface card 1200 according to an eighth embodiment of the present invention.

Referring to FIG. 12, the network interface card (NIC) 1200 according to the eighth embodiment of the present invention includes a first time delay estimating circuit 1220, a second time delay estimating circuit 1230, a data frame counting circuit 1240, a determining circuit 1250, and an interrupt generating circuit 1260.

The first time delay estimating circuit 1220 estimates a first time delay in response to received data frames DFB and stops estimating the first time delay in response to an interrupt INTS.

The second time delay estimating circuit 1230 estimates a second time delay in response to received data frames DFB and stops estimating the second time delay in response to the interrupt INTS. The second time delay is a time interval between the received data frames and is shorter than the first time delay.

The data frame counting circuit 1240 counts the number of data frames DFB received in response to data frames DFB received and stops counting the data frames in response to the interrupt INTS.

The determining circuit 1250 determines whether the first time delay has passed in response to an output signal OTDS1 of the first time delay estimating circuit 1220, determines whether the second time delay has passed in response to an output signal OTDS2 of the second time delay estimating circuit 1230, determines whether the number of data frames DFB received is equal to N in response to an output signal ODFS of the data frame counting circuit 1240, and generates an interrupt control signal CTRLS for controlling generation of the interrupt INTS.

The interrupt generating circuit 1260 generates the interrupt INTS in response to the interrupt control signal CTRLS.

The network interface card (NIC) 1200 can further include a receiving circuit 1210 which receives data frames DFA and transmits the data frames DFA to the first time delay estimating circuit 1220, the second time delay estimating circuit 1230, and the data frame counting circuit 1240, and a transmitting circuit 1270 which receives and transmits the interrupt INTS.

Hereinafter, an operation of the NIC 1200 will be described with reference to FIG. 12.

The NIC 1200 of FIG. 12 corresponds to the method of generating interrupts 400 of FIG. 4. The first time delay estimating circuit 1220 estimates a first time delay in response to received data frames DFB. The interrupt INTS is generated after the first time delay has passed from when the data frames DFB are received. Thus, all the data frames DFB, which are received before the interrupt INTS is generated and after a first data frame is received, can be processed by an interrupt INTS. Therefore, the first time delay has to be longer than the time necessary for receiving one data frame DFB. The first time delay estimating circuit 1220 can include a timer, which measures a predetermined time in response to data frames DFB. However, those skilled in the art can understand that the first time delay estimating circuit 1220 can be another device and is not limited to the timer. The first time delay estimating circuit 1220 stops estimating the time delay if the interrupt INTS is generated.

The determining circuit 1250 determines whether the first time delay has passed in response to an output signal OTDS1 of the first time delay estimating circuit 1220. For example, the output signal OTDS1 is generated at a first logic level if a predetermined time delay has not passed, and the output signal. OTDS1 is generated at a second logic level if the first time delay has passed. Then, the determining circuit 1250 can determine whether the first time delay has passed according to the logic level of the output signal OTDS1. The determining circuit 1250 generates the interrupt control signal CTRLS at the first logic level if it is determined that the first time delay estimating circuit 1220 does not reach the time delay by using the logic level of the output signal OTDS1, and generates the interrupt control signal CTRLS at the second logic level if it is determined that the first time delay estimating circuit 1220 reaches the time delay by using the logic level of the output signal OTDS1. Then, the interrupt generating circuit 1260 generates the interrupt INTS in response to the logic level of the interrupt control signal CTRLS. Since those skilled in the art can achieve a configuration of the determining circuit 1250 and the interrupt generating circuit 1260, descriptions for such configurations will not be described.

In addition, it can be easily understood by those skilled in the art that the functions of the first and the second logic levels described here can be exchanged with each other.

If the time delay estimated by the first time delay estimating circuit 1220 is set to a long time period, some data frames DFB may not be received because a memory may be filled with data frames DFB before the interrupt INTS is generated when the first time delay has passed. Therefore, the data frame counting circuit 1240 counts the number of received data frames DFB.

The number of data frames DFB can be determined by using the logic level of the output signal ODFS of the data frame counting circuit 1240. That is, the output signal ODFS of the data frame counting circuit 1240 is outputted at a first logic level before the number of data frames DFB equals N, and the output signal ODFS of the data frame counting circuit 1240 is outputted at a second logic level if the number of data frames DFB equals N. Thus, the determining circuit 1250 generates the interrupt control signal CTRLS at the first logic level or at the second logic level according to the logic level of the output signal ODFS of the data frame counting circuit 1240. The interrupt generating circuit 1260 generates the interrupt INTS in response to the interrupt control signal CTRLS when the number of data frames DFB received equals N.

The data frame counting circuit 1240 can be a counter, which counts the number of received data frames DFB. However, those skilled in the art can understand that the data frame counting circuit 1240 can be another device and is not limited to the timer.

If the time interval between received data frame DFB is great and the first time delay is set too long, the time necessary for processing a first data frame DFB also becomes long. Thus, in the present invention, data frames DFB received are processed by generating the interrupt INTS if the time interval between the data frames DFB is greater than the predetermined delay time.

That is, the second time delay estimating circuit 1230 estimates a time from when a first data frame is received to when the next data frame is received. The determining circuit 1250 receives an output signal OTDS2 of the second time delay estimating circuit 1230 in addition to the output signals OTDS1 and ODFS of the first time delay estimating circuit 1220 and the data frame counting circuit 1240 and determines whether the time interval between the received data frames is equal to the second time delay. The interrupt generating circuit 1260 receives the interrupt control signal CTRLS outputted from the determining circuit 1250 and generates the interrupt INTS.

It can be determined whether the time interval between the received data frames is equal to the second time delay by using the logic level of the output signal OTDS2 of the second time delay estimating circuit 1230. That is, the output signal OTDS2 of the second time delay estimating circuit 1230 is generated at the first logic level before the time interval between the data frames reaches the second time delay, and the output signal OTDS2 of the second time delay estimating circuit 1230 is generated at the second logic level if the time interval between the data frames reaches the second time delay. Then, the determining circuit 1250 generates the interrupt control signal CTRLS at the first logic level or the second logic level according to the logic level of the output signal OTDS2 of the second time delay estimating circuit 1230. The interrupt generating circuit 1260 generates the interrupt INTS in response to the interrupt control signal CTRLS at a logic level the same as a logic level of a case when the time interval between the received data frames is equal to the second time delay.

The second time delay estimating circuit 1230 can include a timer similar to the first time delay estimating circuit 1220. However, those skilled in the art can understand that the second time delay estimating circuit 1230 can be another device and is not limited to the timer.

The network interface card (NIC) 1200 can further include a receiving circuit 1210 which receives data frames DFA and transmits the data frames DFA to the first time delay circuit 1220, the second time delay circuit 1230, and the data frame counting circuit 1240, and a transmitting circuit 1270 which receives and transmits the interrupt INTS.

Since those skilled in the art can achieve a configuration of the receiving circuit 1210 or the transmitting circuit 1270, such configurations will not be described.

In addition, since the operation of the NIC 1200 according to the eighth embodiment of the present invention can be understood by those skilled in the art from the method of generating interrupts of FIG. 4, it will not be described here.

Figure 13:
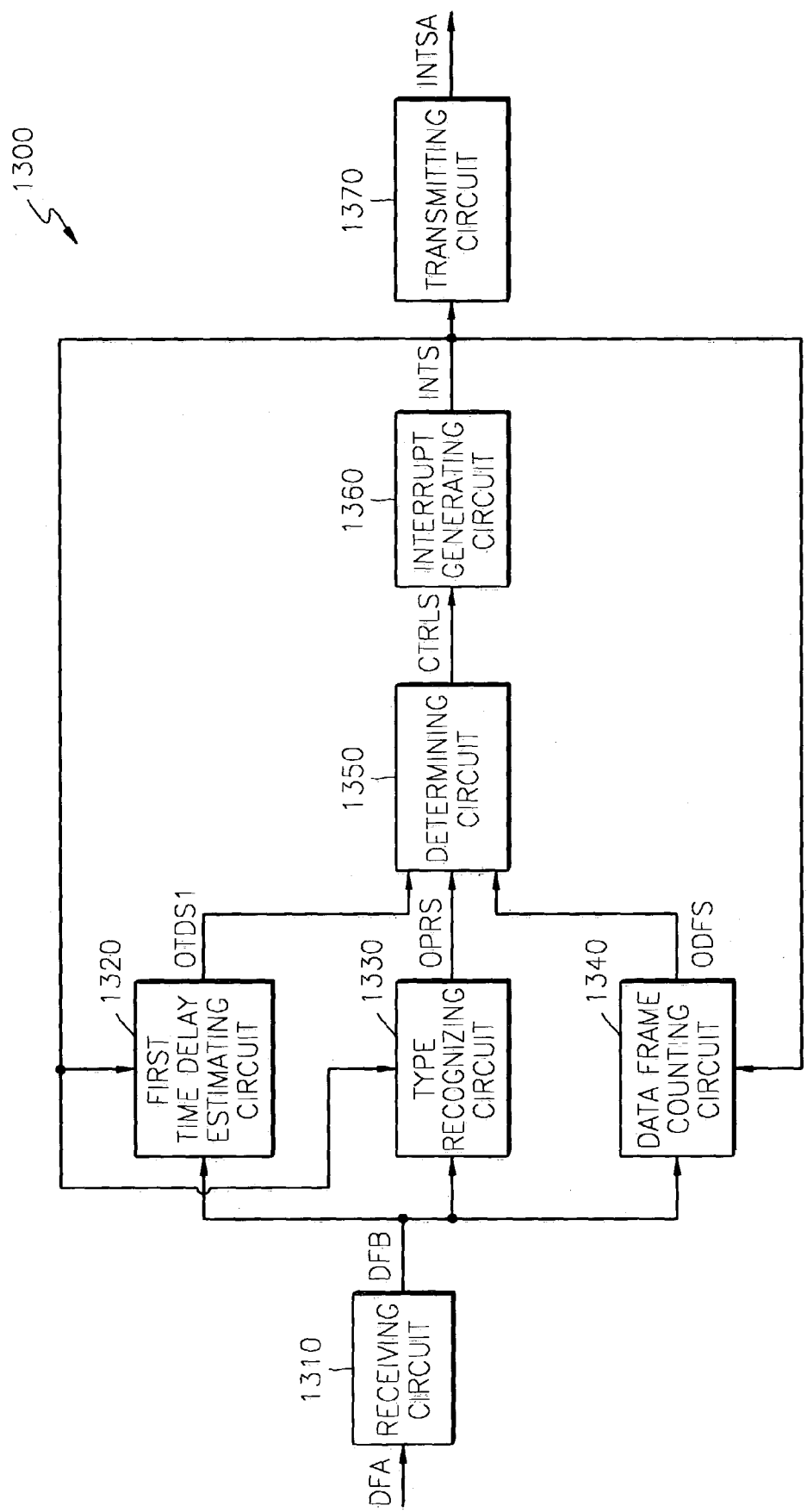
FIG. 13 is a block diagram illustrating a network interface card according to a ninth embodiment of the present invention.

FIG. 13 is a block diagram illustrating a network interface card 1300 according to a ninth embodiment of the present invention.

The network interface card 1300 of FIG. 13 includes a first time delay estimating circuit 1320, a data frame counting circuit 1340, a type recognizing circuit 1330, a determining circuit 1350, and an interrupt generating circuit 1360.

The first time delay estimating circuit 1320 estimates a first time delay in response to received data frames DFB and stops estimating the first time delay in response to an interrupt INTS. The data frame counting circuit 1340 counts the number of received data frames DFB in response to the data frames DFB received and stops counting the number of received data frames DFB in response to the interrupt.

The type recognizing circuit 1330 recognizes a type field of data frames in response to the received data frames DFB and stops recognizing the type field in response to the interrupt INTS.

The determining circuit 1350 determines whether the first time delay estimating circuit 1320 reaches a time delay in response to the output signal OTDS1 of the first time delay estimating circuit 1320, determines whether the number of received data frames DFB equals N in response to an output signal ODFS of the data frame counting circuit 1340, determines whether the type field recognized in response to an output signal OPRS of the type recognizing circuit 1330 is identical to a predetermined type field, and generates an interrupt control signal CTRLS for controlling generation of the interrupt INTS.

The interrupt generating circuit 1360 generates the interrupt INTS in response to the interrupt control signal CTRLS.

Referring to FIG. 13, the NIC 1300 according to the ninth embodiment of the present invention includes the type recognizing circuit 1330 instead of the second time delay estimating circuit 1230 of the NIC 1200 of FIG. 12. That is, operations related to the first time delay estimating circuit 1320 and the data frame counting circuit 1340 are identical to the operation of the NIC 1200 of FIG. 12, and an operation of recognizing the type field of the data frames DFB is added to operations of the NIC 1200 of FIG. 12.

In addition, operations of the NIC 1300 correspond to the method of generating interrupts of FIG. 7.

Among the received data frames, there are several data frames that have to be processed within a predetermined time. If such data frames that are predetermined are received, they are recognized, and thus interrupts are generated.

There are several fields, e.g., a destination address field, a source address field, a type field, a data field, a cyclic redundancy check (CRC) field, and the like, in data frames. In each field, destination addresses, source addresses, types, data, cyclic redundancy checks (CRC), and the like are stored respectively. In the type fields, information on the type of data of data frames is stored.

The type of data that has to be processed within a certain time is predetermined, and a type field is searched for. If a searched type field is identical to the predetermined type field, interrupts are generated.

The type field is placed on a predetermined location in the data frame. In general, the destination address field and the source address field combined have a length of 12 bytes. The type field has a length of 2 bytes. Thus, the type recognizing circuit 1330 reads 2 bytes after 12 bytes from the upmost bit of the received data frames and recognizes a type field of 2 bytes. If the recognized type field is identical to a predetermined type field, the type recognizing circuit 1330 generates an output signal OPRS at the first logic level. If the recognized type field is not identical to the predetermined type field, the type recognizing circuit 1330 generates the output signal OPRS at the second logic level. Here, the first logic level may be a high level, and the second logic level may be a low level. However, the first and the second logic levels described here can be exchanged with each other.

The type recognizing circuit 1330 recognizes a location of the type field of the received data frames and determines whether the type field is identical to the predetermined type field. The type recognizing circuit 1330 can be easily made by those skilled in the art.

The NIC 1300 according to the ninth embodiment of the present invention can further include a receiving circuit 1310 and a transmitting circuit 1370. The functions of the receiving circuit 1310 and the transmitting circuit 1370 are the same as the embodiment of FIG. 12.

Since the operation of the NIC 1300 according to the ninth embodiment of FIG. 13 can be understood by those skilled in the art from the method of generating interrupts of FIG. 7, the operation of the NIC 1300 will not be described.

Figure 14:
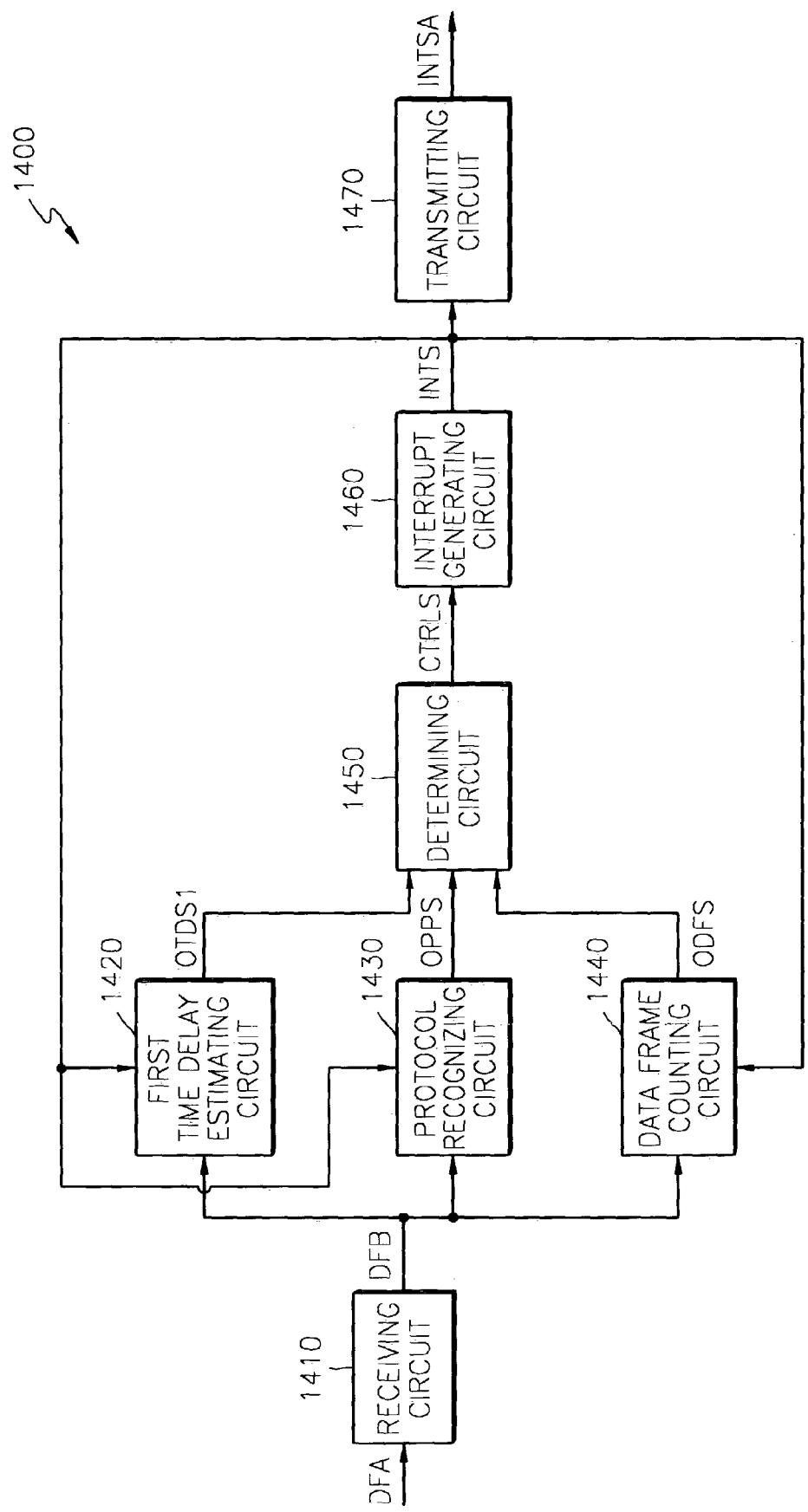
FIG. 14 is a block diagram illustrating a network interface card according to a tenth embodiment of the present invention.

FIG. 14 is a block diagram showing a network interface card 1400 according to a tenth embodiment of the present invention.

The network interface card (NIC) 1400 of FIG. 14 includes a first time delay estimating circuit 1420, a data frame counting circuit 1440, a protocol recognizing circuit 1430, a determining circuit 1450, and an interrupt generating circuit 1460.

The first time delay estimating circuit 1420 estimates a first time delay in response to the data frames DFB received and stops estimating the first time delay in response to an interrupt INTS. The data frame counting circuit 1440 counts the number of data frames DFB in response to the data frames DFB received and stops counting the received data frames DFB in response to the interrupt INTS.

The protocol recognizing circuit 1430 recognizes a protocol field of a packet header in a data field of the received data frames DFB in response to the received data frames DFB and stops recognizing the protocol field in response to the interrupt INTS.

The determining circuit 1450 determines whether the first time delay estimating circuit 1420 reaches the first time delay in response to an output signal OTDS1 of the first time delay estimating circuit 1420, determines whether the number of received data frames DFB equals N in response to an output signal ODFS of the data frame counting circuit 1440, determines whether the protocol field recognized in response to an output signal OPPS of the protocol recognizing circuit 1430 is identical to a predetermined protocol field, and generates an interrupt control signal CTRLS for controlling generation of the interrupt INTS.

The interrupt generating circuit 1460 generates the interrupt INTS in response to the interrupt control signal CTRLS.

Referring to FIG. 14, the NIC 1400 according to the tenth embodiment of FIG. 14 includes the protocol recognizing circuit 1430 instead of the second time delay estimating circuit 1230 of the NIC 1200 of FIG. 12. That is, operations related to the first time delay estimating circuit 1420 and the data frame counting circuit 1440 are identical to the operation of the NIC 1200 of FIG. 12, and an operation of recognizing the protocol field of the data frames DFB is added to operations of the NIC 1200 of FIG. 12.

In addition, operations of the NIC 1400 correspond to the method of generating interrupts 900 of FIG. 9.

As described in the method of generating interrupts 900 of FIG. 9, a packet which is generated in a protocol of an upper layer via Ethernet is placed in a data field of the received data frames. An Internet Protocol (IP) is most widely used among the protocols of the upper layer over Ethernet.

An IP packet includes two regions, e.g., an IP packet header and IP packet data. The protocol recognizing circuit 1430 of the NIC 1400 of FIG. 14 recognizes the protocol field of the IP packet header. In the protocol field, control information on a type of protocol data stored in the IP packet data is stored.

The protocol recognizing circuit 1430 determines whether the IP packet is included in the received data frames, and extracts and recognizes the protocol field if the IP packet is included in the received data frames. In addition, the protocol recognizing circuit 1430 determines whether the recognized protocol field is identical to a predetermined protocol field. Since the protocol recognizing circuit 1430 can be made by those skilled in the art, it will not be described here.

If the recognized protocol field is identical to the predetermined protocol field, the protocol recognizing circuit 1430 generates an output signal OPPS at a first logic level.

If the recognized protocol field is not identical to the predetermined protocol field, the protocol recognizing circuit 1430 generates the output signal OPPS at a second logic level. Here, the first logic level may be a high level, and the second logic level may be a low level. However, the first and the second logic levels described here can be exchanged with each other.

The interrupt generating circuit 1260 generates the interrupt INTS in response to the interrupt control signal CTRLS at a logic level same as the logic level in the case where the recognized protocol field is identical to a predetermined protocol field.

If the interrupt INTS is generated, operations of the first time delay estimating circuit 1420, the protocol recognizing circuit 1430, and the data frame counting circuit 1440 are stopped until a new data frame is received.

The NIC 1400 according to the tenth embodiment of the present invention can further include a receiving circuit 1410 and a transmitting circuit 1470. Functions of the receiving circuit 1410 and the transmitting circuit 1470 are identical to the embodiment of FIG. 12.

Since operations of the NIC 1400 according to the tenth embodiment of the present invention can be understood by those skilled in the art from the method of generating interrupts 900 of FIG. 9, they will not be described here.

Figure 15:
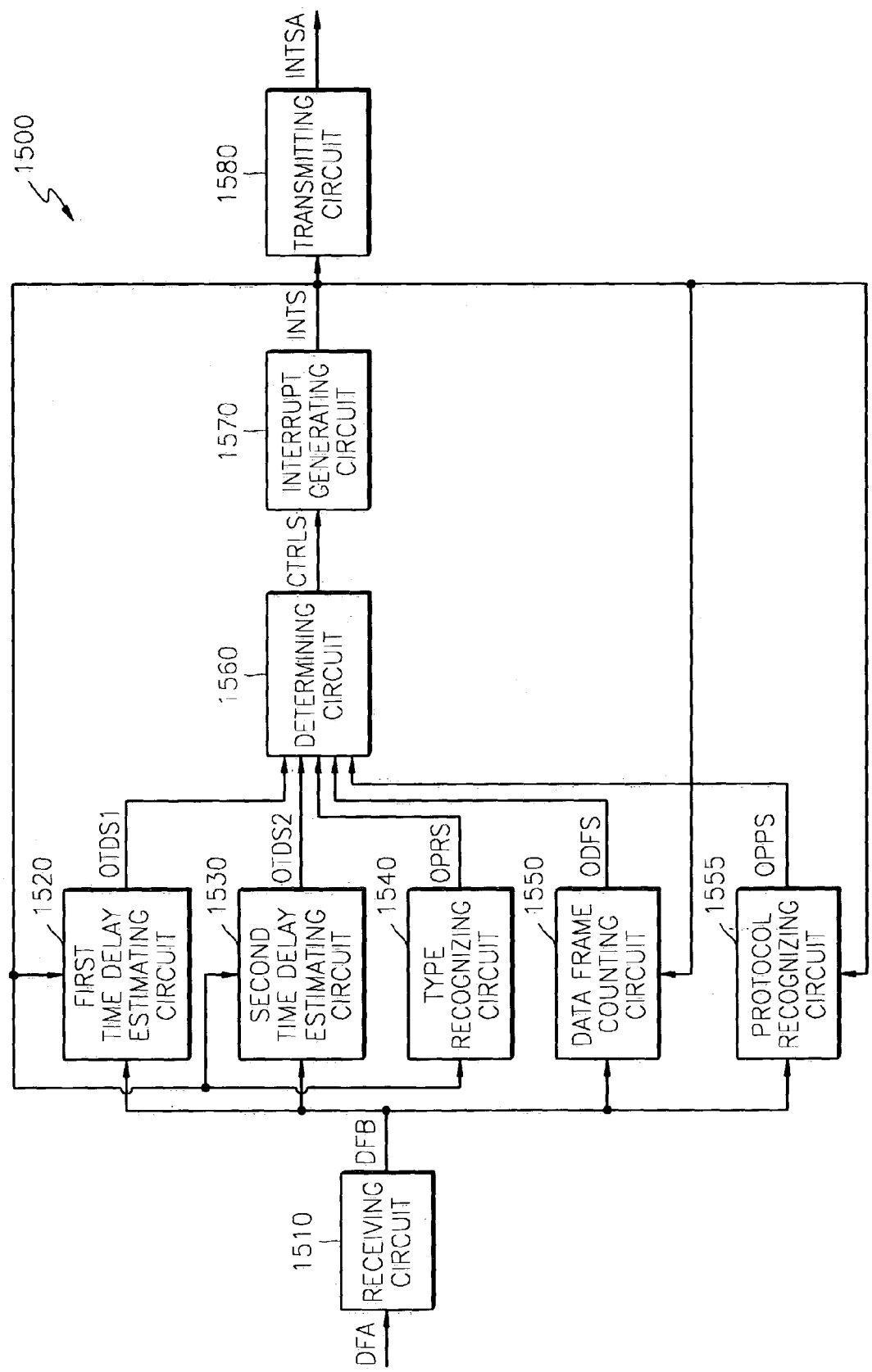
FIG. 15 is a block diagram illustrating a network interface card according to an eleventh embodiment of the present invention.

FIG. 15 is a block diagram illustrating a network interface card 1500 according to an eleventh embodiment of the present invention.

A network interface card (NIC) 1500 of FIG. 15 includes a first time delay estimating circuit 1520, a second time delay estimating circuit 1530, a data frame counting circuit 1550, a type recognizing circuit 1540, a protocol recognizing circuit 1555, a determining circuit 1560, and an interrupt generating circuit 1570.

The first time delay estimating circuit 1520 estimates a first time delay in response to received data frames DFB and stops estimating the first time delay in response to an interrupt INTS.

The second time delay estimating circuit 1530 estimates a second time delay in response to the received data frames DFB and stops estimating the second time delay in response to the interrupt INTS. The second time delay is a time interval between the received data frames DFB and is shorter than the first time delay.

The data frame counting circuit 1550 counts the number of received data frames DFB in response to the received data frames DFB and stops counting the data frames DFB in response to the interrupt INTS.

The type recognizing circuit 1540 recognizes a type field of the data frames DFB received in response to the received data frames DFB and stops recognizing the type field in response to the interrupt INTS.

The protocol recognizing circuit 1555 recognizes a protocol field of a packet header in a data field of the received data frames DFB in response to the received data frames DFB and stops recognizing the protocol field in response to the interrupt INTS.

The determining circuit 1560 determines whether the first time delay has passed in response to an output signal OTDS1 of the first time delay estimating circuit 1520, determines whether the second time delay has passed in response to an output signal OTDS2 of the second time delay estimating circuit 1530, determines whether the number of received data frames DFB equals N in response to an output signal ODFS of the data frame counting circuit 1550, determines whether the recognized type field is identical to a predetermined type field in response to an output signal OPRS of the type recognizing circuit 1540, determines whether a protocol field recognized by the protocol recognizing circuit 1555 is identical to a predetermined protocol field in response to an output signal OPPS of the protocol recognizing circuit 1555, and generates the interrupt control signal CTRLS for controlling generation of the interrupt INTS.

The interrupt generating circuit 1570 generates the interrupt INTS in response to the interrupt control signal CTRLS.

Referring to FIG. 15, the NIC 1500 according to the eleventh embodiment of the present invention is created by combining configurations of the NICs 1200, 1300, and 1400.

Since operations of the NIC 1500 correspond to the method of generating interrupts 1100 of FIG. 11, they will not be described here.

As described above, a method of generating interrupts and a network interface card (NIC) according to embodiments of the present invention can minimize the number of interrupts generated and process many data frames by single generation of interrupts.

While the present invention has been particularly shown and described with reference to exemplary embodiments thereof, it will be understood by those of ordinary skill in the art that various changes in form and details may be made therein without departing from the spirit and scope of the present invention as defined by the following claims.

What is claimed is:

1. A method of generating interrupts of a network interface card which transceives data, the method comprising:
   (a) receiving data frames;
   (b) determining a first time delay and a second time delay in response to a received data frame and counting a number of received data frames, wherein the second time delay is a time interval between reception times of two data frames and excludes processing times of the data frames;
   (c) determining whether the first time delay has passed and generating an interrupt if the first time delay has passed;
   (d) counting the number of data frames if the first time delay has not passed and generating the interrupt if the number of data frames equals N;
   (e) determining whether the second time delay has passed if the number of data frames is not equal to N and generating the interrupt if the second time delay has passed, or going back to step (b) if the second time delay has not passed;
   (f) stopping operations of determining the first and second time delays and counting the number of data frames in response to the interrupts generated, and transmitting the received data frames; and
   (g) receiving a new data frame and going back to step (b).

2. The method of claim 1, wherein the first time delay starts from when a first data frame is received.

3. The method of claim 1, wherein the second time delay is shorter than the first time delay, and excludes times of the data frames.

4. A method of generating interrupts of a network interface card which transceives data, the method comprising:
   (a) receiving data frames;
   (b) determining a packet time delay in response to the received data frames;
   (c) determining whether the packet time delay has passed, wherein the packet time delay is a time interval between reception times of two data frames and excludes processing times of the data frames, and generating an interrupt if the packet time delay has passed, or going back to step (b) if the packet time delay has not passed;
   (d) stopping an operation of determining the packet time delay and transmitting the received data frames; and
   (e) receiving a new data frame and going back to step (b).

5. The method of claim 4, further comprising:
   counting a number of received data frames and recognizing a type field of the received data frames;
   counting the number of received data frames and generating the interrupt if the number of received data frames is N;
   determining whether the type field of the received data frames is identical to a predetermined type field if the number of data frames is not equal to N, generating the interrupt if the type field is identical to the predetermined type field, or going back to step (b) if the type field is not identical to the predetermined type field, wherein the type field includes information on the type of data of the received data frames; and wherein the stopping further includes stopping operations of counting the number of received data frames and recognizing the type field of the data frame in response to the interrupt generated.

6. The method of claim 5, wherein the time delay starts from when the first data frame is received.

7. The method of claim 4, further comprising:
recognizing a type field of the received data frames;
determining whether the type field of the received data frames is identical to a predetermined type field and generating an interrupt if the type field is identical to the predetermined type field or going back to step (b) if the type field is not identical to the predetermined type field, wherein the type field includes information on the type of data of the received data frames; and
wherein the stopping further includes stopping an operation of recognizing the type field of the received data frames in response to the generated interrupt.

8. The method of claim 4, further comprising:
counting a number of received data frames and recognizing a protocol field of a packet header in a data field of the received data frames;
determining whether the number of received data frames is equal to N if the time delay has not passed and generating the interrupt if the number of data frames is equal to N;
determining whether the protocol field is identical to a predetermined protocol field if the number of received data frames is not equal to N and generating the interrupt if the protocol field is identical to the predetermined protocol field, or going back to step (b) if the protocol field is not identical to the predetermined protocol field; and
wherein the stopping further includes stopping operations of counting the number of received data frames and recognizing the protocol field in response to the generated interrupts.

9. The method of claim of claim 8, wherein the time delay starts from when a first data frame is received.

10. The method of claim 4, further comprising:
recognizing a protocol field of a packet header in a data field of the received data frames;
determining whether the protocol field is identical to a predetermined protocol field and generating an interrupt if the protocol field is identical to the predetermined protocol field, or going back to step (b) if the protocol field is not identical to the predetermined protocol field; and
wherein the stopping further includes stopping an operation of recognizing the protocol field.

11. The method of claim 4, further comprising:
determining a second time delay in response to the received data frames, counting a number of received data frames, recognizing a type field of the received data frames, wherein the type field includes information on the type of data of the received data frames, and recognizing a protocol field of a packet header in a data field of the received data frames;
counting the number of received data frames if the packet time delay has not passed and generating the interrupt if the number of received data frames is equal to N;
determining whether the second time delay has passed if the number of received data frames is not equal to N and generating the interrupt if the second time delay has passed;
determining whether the type field of the received data frames is identical to a predetermined type field if the second time delay has not passed and generating the interrupt if the type field is identical to the predetermined type field;
determining whether the protocol field of the received data frames is identical to a predetermined protocol field if the type field is not identical to the predetermined type field and generating the interrupt if the protocol field is identical to the predetermined protocol field, or going back to step (b) if the protocol field is not identical to the predetermined protocol field; and
wherein the stopping further includes stopping operations of determining the the second time delay, counting the number of received data frames and recognizing the type field and the protocol field of the data frames in response to the generated interrupt.

12. The method of claim 11, wherein the first time delay starts from when a first data frame is received.

13. The method of claim 11, wherein the second time delay is shorter than the first time delay.

14. A network interface card, which minimizes the number of times where interrupts are generated, the network interface card comprises:
a first time delay determining circuit, which determines a first time delay in response to received data frames and stops determining the first time delay in response to an interrupt;
a second time delay determining circuit, which determines a second time delay in response to the received data frames and stops determining the second time delay in response to the interrupt, wherein the second time delay is a time interval between reception times of two data frames and excludes processing times of the data frames;
a data frame counting circuit, which counts a number of received data, frames in response to the received data frames and stops counting the data frames in response to the interrupt;
a determining circuit which determines whether the time reaches the first time delay in response to an output signal of the first time delay determining circuit, determines whether the time reaches the second time delay in response to an output signal of the second time delay determining circuit, determines whether the number of received data frames is equal to N in response to an output signal of the data frame counting circuit, and generates an interrupt control signal for controlling generation of the interrupt; and
an interrupt generating circuit which generates the interrupt in response to the interrupt control signal.

15. The network interface card of claim 14, wherein the first time delay is determined from when a first data frame is received.

16. The network interface card of claim 14, wherein the second time delay is shorter than the first time delay.

17. A network interface card, which minimizes the number of times where interrupts are generated, the network interface card comprises:
time first delay determining circuit, which determines a first time delay in response to received data frames and stops determining the first time delay in response to an interrupt;
a second time delay determining circuit, which determines a second time delay in response to the received data frames and stops determining the second time delay in response to the interrupt, wherein the second time delay is a time interval between reception times of two data frames and excludes processing times of the data frames;
a type recognizing circuit, which recognizes a type field of data, frames in response to the received data frames and stops recognizing the type field in response to the interrupt;
a data frame counting circuit, which counts a number of received data, frames in response to the received data frames and stops counting the number of received data frames in response to the interrupt;
a determining circuit which determines whether the first time delay has been reached in response to the output signal of the first time delay determining circuit, determines whether the second time delay has been reached in response to an output signal of the second time delay determining circuit, determines whether the number of received data frames is equal to N in response to an output signal of the data frame counting circuit, determines whether the type field recognized in response to an output signal of the type recognizing circuit is identical to a predetermined type field, and generates an interrupt control signal for controlling generation of the interrupt; and
an interrupt generating circuit which generates the interrupt in response to the interrupt control signal.

18. The network interface card of claim 17, wherein the first time delay starts from when a first data frame is received.

19. A network interface card, which minimizes the number of times where interrupts are generated, the network interface card comprises:
a first time delay determining circuit, which determines a first time delay in response to received data frames and stops determining the first time delay in response to an interrupt;
a second time delay determining circuit, which determines a second time delay in response to the received data frames and stops determining the second time delay in response to the interrupt, wherein the second time delay is a time interval between reception times of two data frames and excludes processing times of the data frames;
a protocol recognizing circuit which recognizes a protocol field of a packet header in a data field of the received data frames in response to the received data frames and stops recognizing the protocol field in response to the interrupt;
a data frame counting circuit, which counts a number of received data, frames in response to the received data frames and stops counting the number of received data frames in response to the interrupt;
a determining circuit which determines whether the first time delay has been reached in response to the output signal of the first time delay determining circuit, determines whether the second time delay has been reached in response to an output signal of the second time delay determining circuit, determines whether the number of received data frames is equal to N in response to an output signal of the data frame counting circuit, determines whether the protocol field recognized in response to an output signal of the type recognizing circuit is identical to a predetermined type field, and generates an interrupt control signal for controlling generation of the interrupt; and
an interrupt generating circuit which generates the interrupt in response to the interrupt control signal.

20. The method of claim 17, the first time delay is determined from when a first data frame is received.

21. The network interface card of claim 19, further comprises:
a type recognizing circuit, which recognizes a type field of data frames in response to the received data frames and stops recognizing the type field in response to the interrupt, wherein the type field includes information on the type of data of the received data frames; and
wherein the determining circuit further determines whether the type field recognized in response to an output signal of the type recognizing circuit is identical to a predetermined type field.

22. The network interface card of claim 21, wherein the first time delay starts from when a first data frame is received.

23. The network interface card of claim 21, wherein the second time delay is shorter than the first time delay.

24. The network interface card of claim 14, the network interface card further comprises:
a receiving circuit which receives data frames and transmits the received data frames to the first time delay determining circuit, the second time delay circuit, and the data frame counting circuit; and
a transmitting circuit which receives and transmits the interrupt.

25. The network interface card of claim 17, the network interface card further comprises:
a receiving circuit which receives data frames and transmits the received data frames to the first time delay determining circuit, the data frame counting circuit, and the type recognizing circuit; and
a transmitting circuit which receives and transmits the interrupt.

26. The network interface card of claim 19, the network interface card further comprises:
a receiving circuit which receives data frames and transmits the received data frames to the first time delay determining circuit, the data frame counting circuit, and the protocol recognizing circuit; and
a transmitting circuit which receives and transmits the interrupt.

27. The network interface card of claim 21, the network interface card further comprises:
a receiving circuit which receives data frames and transmits the received data frames to the first time delay determining circuit, the second time delay circuit, the data frame counting circuit, the type recognizing circuit, and the protocol recognizing circuit; and
a transmitting circuit which receives and transmits the interrupt.

* * * * *